(12) United States Patent
Collier

(10) Patent No.: US 6,346,069 B1
(45) Date of Patent: Feb. 12, 2002

(54) CENTRIFUGAL PRESSURIZED SEPARATORS AND METHODS OF CONTROLLING SAME

(75) Inventor: Kevin E. Collier, Kaysville, UT (US)

(73) Assignee: Separation Process Technology, Inc., Kaysville, UT (US)

( * ) Notice: Subject to any disclaimer, the term of this patent is extended or adjusted under 35 U.S.C. 154(b) by 0 days.

(21) Appl. No.: 09/441,598

(22) Filed: Nov. 17, 1999

Related U.S. Application Data
(60) Provisional application No. 60/147,669, filed on Aug. 6, 1999.

(51) Int. Cl.[7] ............................. B04B 1/04; B04B 11/00
(52) U.S. Cl. ................................. 494/3; 494/1; 494/74; 494/79; 210/97; 210/112; 210/115; 210/360.1; 210/380.1; 210/741; 210/787
(58) Field of Search .................. 210/741, 787, 210/97, 112, 115, 360.1, 380.1; 494/1, 3, 37, 74, 79

(56) References Cited

U.S. PATENT DOCUMENTS

| | | |
|---|---|---|
| 315,876 A | 4/1885 | Zimmer |
| 382,966 A | 5/1888 | Freitag |
| 632,616 A | 9/1899 | Alfven |

(List continued on next page.)

FOREIGN PATENT DOCUMENTS

| | | |
|---|---|---|
| DE | 40702 | 9/1887 |
| DE | 321 855 | 6/1920 |
| DE | 610 608 | 3/1935 |
| DE | 723 672 | 8/1942 |
| DE | 1 113 184 | 8/1961 |

(List continued on next page.)

OTHER PUBLICATIONS

Technology in Perspective, *Giving Ear to Improve Centrifuge Performance*, 1990.
Brochure on ALFAX Self-Cleaning Centrifugal Separators with Controlled Partial Discharge—WHPX Series, No. PD A0717E5, ALFA-LAVAZ, 1990.
Brochure on ALFA-LAVAL Separation, No. PD 41075E, 1990.
Tim Cornitius, *Advances in Water Treating Solving Production Problems*, Offshore, Mar. 1988, pp. 27–29.
*Multiphase Boosting and Metering*, The Products of Today for Tomorrow, Framo Engineering AS, Norway, 1992.

*Primary Examiner*—David A. Reifsnyder
(74) *Attorney, Agent, or Firm*—Workman, Nydegger & Seeley

(57) ABSTRACT

A solid-liquid/liquid-liquid separator includes a vessel having a peripheral wall bounding a chamber. The chamber communicates with an inlet port and an outlet port. The vessel is rotatable about a rotational axis extending through the vessel. Disposed within the chamber are a plurality of fins. Each of the fins radially outwardly projecting from the rotational axis in substantially parallel alignment with the rotational axis. The fins interact with the peripheral wall to form a plurality of discrete flow channels that longitudinally extend through the vessel. An exit tube is disposed along a portion of the rotational axis of the vessel. The exit tube has a first end disposed within the chamber and an opposing second end in fluid communication with the exterior of vessel. A plurality of extraction tubes radially outwardly projecting from the rotational axis within the chamber. The extraction tubes have a first end in fluid communication with the exit tube and an opposing second end disposed a distance from the peripheral wall. A solid-liquid or liquid-liquid mixture is fed into the rotating pressure vessel and the elements thereof are separate by centrifugal force. Overflow material exits through the outlet port. Underflow material is drawn into the extraction tubes and exits the vessel through the exit tube.

28 Claims, 15 Drawing Sheets

U.S. PATENT DOCUMENTS

| | | |
|---|---|---|
| 635,488 A | 10/1899 | Kneeland |
| 690,883 A | 1/1902 | Sharples |
| 699,217 A | 5/1902 | McComack |
| 1,664,769 A | 4/1928 | Chance |
| 1,699,379 A | 1/1929 | Sperry |
| 1,782,974 A | 11/1930 | Rozieres |
| 1,811,157 A | 6/1931 | Schwerdtfeger |
| 1,870,113 A | 8/1932 | Hawkins et al. |
| 2,010,405 A | 8/1935 | MacIssac |
| 2,067,590 A | 1/1937 | Ayres |
| 2,073,216 A | 3/1937 | Mann |
| 2,077,813 A | 4/1937 | Strezynski |
| 2,126,864 A | 8/1938 | Bath |
| 2,145,541 A | 1/1939 | Forsberg |
| 2,269,716 A | 1/1942 | Gregg |
| 2,337,291 A | 12/1943 | Adams et al. |
| 2,422,464 A | 6/1947 | Bartholomew |
| 2,594,445 A | 4/1952 | Keith, Jr. |
| 2,719,668 A | 10/1955 | Bergner |
| 2,733,855 A | 2/1956 | McCoy |
| 2,870,912 A | 1/1959 | Mathieu |
| 3,059,282 A | 10/1962 | Smith |
| 3,081,027 A | 3/1963 | Coulson |
| 3,168,474 A * | 2/1965 | Stallman et al. ............... 494/74 |
| 3,201,036 A | 8/1965 | Halbach et al. |
| 3,288,360 A | 11/1966 | Babelay et al. |
| 3,307,780 A | 3/1967 | Kompert |
| 3,341,093 A | 9/1967 | Putterlik |
| 3,408,000 A | 10/1968 | Nilson |
| 3,437,209 A | 4/1969 | Evans |
| 3,460,751 A | 8/1969 | Hemfort, Sr. |
| 3,494,545 A | 2/1970 | Nilson |
| 3,535,158 A | 10/1970 | McBride et al. |
| 3,623,658 A | 11/1971 | Garbaty |
| 3,642,196 A | 2/1972 | Nilsson |
| 3,647,135 A | 3/1972 | Mercier |
| 3,655,058 A | 4/1972 | Novak |
| 3,702,704 A | 11/1972 | Bloch |
| 3,703,984 A | 11/1972 | Pruessner |
| 3,730,423 A | 5/1973 | Coulson |
| 3,750,940 A | 8/1973 | Nilsson |
| 3,752,389 A | 8/1973 | Nilsson |
| 3,774,840 A | 11/1973 | Boatright |
| 3,825,177 A | 7/1974 | Kohlstett |
| 3,847,327 A | 11/1974 | Erikson et al. |
| 3,883,114 A | 5/1975 | Harris et al. |
| 3,938,734 A | 2/1976 | Wilke |
| 3,991,935 A | 11/1976 | Henning |
| 4,015,773 A | 4/1977 | Thylefors |
| 4,098,696 A | 7/1978 | Humphrey et al. |
| 4,151,950 A | 5/1979 | Gunnewig |
| 4,175,040 A | 11/1979 | Sammons et al. |
| 4,190,530 A | 2/1980 | Forsythe, Jr. et al. |
| 4,199,459 A | 4/1980 | Filipowicz et al. |
| 4,295,600 A | 10/1981 | Saget |
| 4,308,136 A | 12/1981 | Warne, Jr. |
| 4,362,620 A | 12/1982 | High |
| 4,406,791 A | 9/1983 | Khapaev |
| 4,425,240 A | 1/1984 | Johnson |
| 4,477,348 A | 10/1984 | Ayers et al. |
| 4,525,155 A | 6/1985 | Nilsson |
| 4,556,528 A | 12/1985 | Gersch et al. |
| 4,626,237 A | 12/1986 | Galloway, Jr. |
| 4,702,837 A | 10/1987 | Lecoffre et al. |
| 4,758,354 A | 7/1988 | O'Mara et al. |
| 4,776,833 A | 10/1988 | Knelson |
| 4,810,240 A | 3/1989 | Zuccato |
| 4,846,780 A | 7/1989 | Galloway et al. |
| 4,855,050 A | 8/1989 | Senyard, Sr. et al. |
| 4,857,040 A | 8/1989 | Kashihara et al. |
| 4,871,458 A | 10/1989 | Purvey |
| 4,936,821 A | 6/1990 | Zuccato |
| 4,959,158 A | 9/1990 | Melkrantz |
| 4,963,272 A | 10/1990 | Garrett |
| 5,037,558 A | 8/1991 | Kalnins |
| 5,045,046 A | 9/1991 | Bond |
| 5,062,955 A | 11/1991 | Sciamanna |
| 5,068,035 A | 11/1991 | Mohr |
| 5,114,568 A | 5/1992 | Brinsmead et al. |
| 5,116,488 A | 5/1992 | Torregrossa |
| 5,133,861 A | 7/1992 | Grieve |
| 5,149,432 A | 9/1992 | Lavin |
| 5,156,745 A | 10/1992 | Cairo, Jr. et al. |
| 5,180,493 A | 1/1993 | Grieve |
| 5,200,083 A | 4/1993 | Kaylor |
| RE34,321 E | 7/1993 | Campbell |
| 5,230,797 A | 7/1993 | Knelson |
| 5,246,592 A | 9/1993 | Schweizer et al. |
| 5,279,637 A * | 1/1994 | Lynam et al. ............... 210/702 |
| 5,354,256 A | 10/1994 | Knelson |
| 5,387,342 A | 2/1995 | Rogers et al. |
| 5,464,536 A | 11/1995 | Rogers |
| 5,466,385 A | 11/1995 | Rogers et al. |
| 5,582,724 A | 12/1996 | Rogers et al. |

FOREIGN PATENT DOCUMENTS

| | | |
|---|---|---|
| DE | 1 432 891 | 9/1969 |
| DE | 23 36 564 | 4/1975 |
| DE | 32 03 185 A1 | 8/1983 |
| DE | 34 08 789 A1 | 9/1985 |
| FR | 672.184 | 12/1929 |
| FR | 826.502 | 4/1938 |
| GB | 260071 | 8/1926 |
| GB | 2 226 271 A | 6/1990 |
| PL | 66 414 | 5/1967 |
| PL | 129 042 | 12/1985 |
| RU | 957929 | 2/1981 |
| WO | WO 93/11877 | 6/1993 |

* cited by examiner

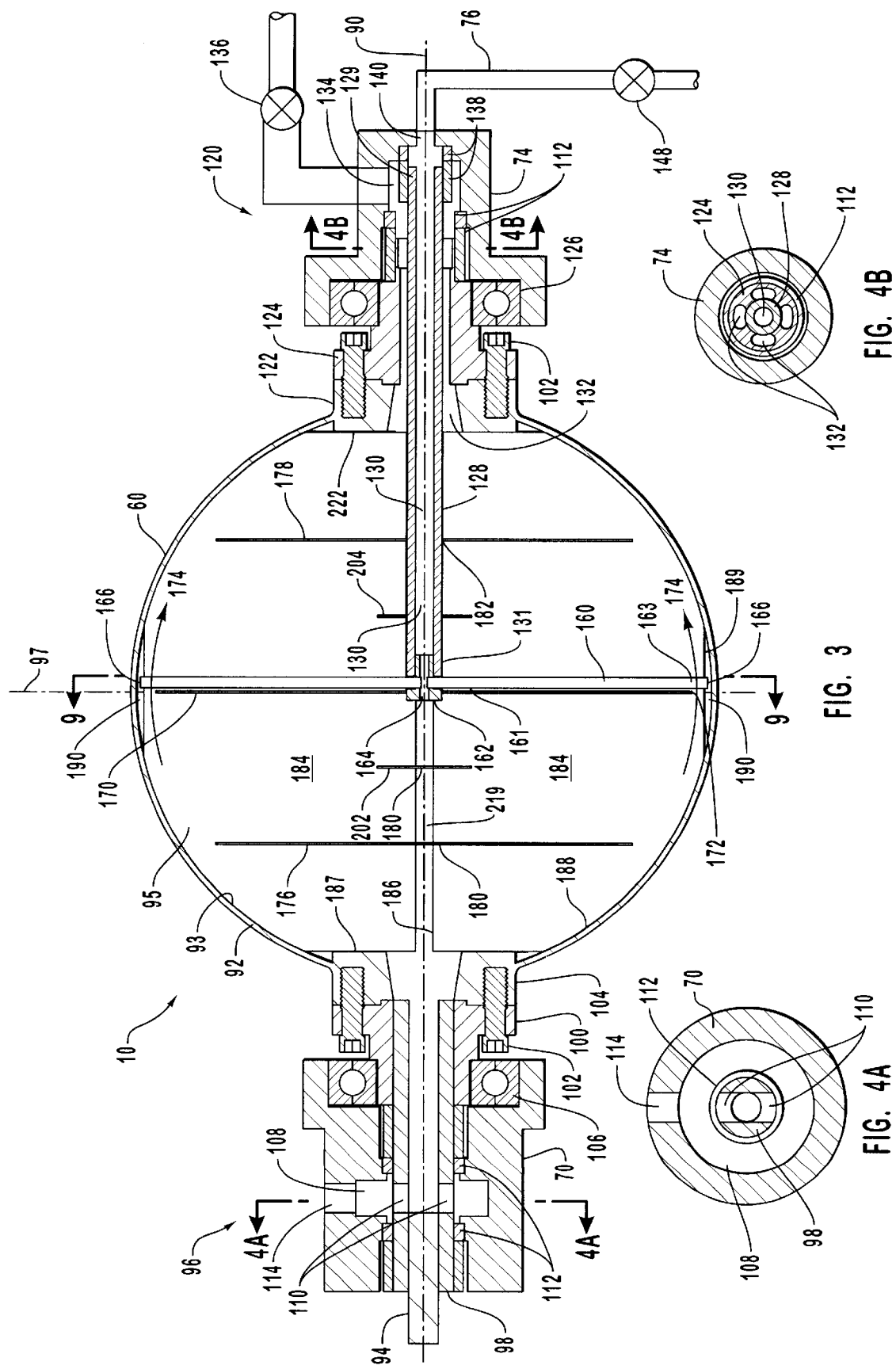

CENTRIFUGAL PRESSURIZED SEPARATORS AND METHODS OF CONTROLLING SAME

The present application claims priority to U.S. Provisional Application Serial No. 60/147,669, filed Aug. 6, 1999, which for purposes of disclosure is incorporated herein by specific reference.

BACKGROUND OF THE INVENTION

1. The Field of the Invention

The present invention relates to a centrifugal separator system for treating water that has been contaminated with both organic and inorganic materials. In one embodiment, the present invention relates to a rotating pressure vessel that separates solids and liquids at a high rate. In another embodiment, the present invention relates to a liquid-liquid separator that responds to radical load disturbances.

2. The Relevant Technology

Water purification is an age-old activity that has been pursued to achieve both potable water and water for industrial use. With the rise of industrialization, water purification took on a new importance because industrial water usage generally involved discharging contaminated water into the environment. As concerns about the environment have increased, water discharged into the environment has been subjected to increasingly higher standards. Thus, increased efforts have been undertaken to identify methods of processing water to substantially reduce both dissolved and particulate pollutants.

One aspect of water purification that is particularly time consuming and/or equipment intensive is liquid-solid separation. Traditionally, settling ponds, or thickeners, have been used in which a large volume of particulate-containing water is allowed to reside in a quiescent state. With the force of gravity acting on the mixture, the particulate, even those in the Stokes flow regime, will separate from the liquid.

One disadvantage to the use of thickeners is that they have to be extremely large to have any significant flow capacity. Thus, their use is not practicable in crowded urban areas where the need for such water purification systems is often the greatest. Consequently, thickeners have been developed that allow for a continuous flow of particulate-containing liquid into the center of the thickener, producing a clarified supernatant liquid and a compacted sludge. The compacted sludge, exiting from the bottom of the thickener, typically has a water content that amounts to between 10 and 30 percent of total water being fed to the thickener.

Traditional thickeners have been improved in the last decade or so with the advent of the high-rate thickener. The high-rate thickener has a center feed well that extends below the mud line of the underflow material. Accordingly, all water entering the thickener must pass through the sludge which acts as a filter medium. By using the sludge as a filter, solid-liquid separation rates are increased, albeit only incrementally over that of traditional thickeners. Additionally, high-rate thickeners also must be very large and, consequently, also have large footprints, rendering their use impractical in many situations.

What is needed in the art is a system for clarifying a particulate-containing liquid that overcomes the space requirement and slow solid-liquid separation rates experienced in the prior art. Such apparatus, systems, and methods are disclosed and claimed herein.

Another aspect of separations includes liquid-liquid systems such as separating the oil and water from a sump in a machine shop or in a washing bay for trains or buses etc. Other liquid-liquid separation systems are utilized in the food industry where oil and water need separation. On of the problems in the prior art is the effect of load disturbances such as a surge of oil or water in a cleaning operation that upsets the balance of the oil/water feed ratio to the separator. Although the separator may be controlled to prevent one component from entering the wrong exit stream, a catastrophic surge of one component or the other cannot be controlled.

Another challenge to the liquid-liquid separator systems is a separation between two immiscible liquids with densities that vary by about 5% or less. Because of the closeness of the densities, separation becomes increasingly difficult.

What is needed in the art is a liquid-liquid separator that overcomes the problems of the prior art.

SUMMARY AND OBJECTS OF THE INVENTION

The present invention relates to separator systems, namely solid-liquid separators and liquid-liquid separators, that include a pressure vessel. The pressure vessel may be spherical or have an alternative configuration such as compound frusto-conical. The ends of the pressure vessel are mounted so that the vessel can be rapidly rotated about a longitudinal or rotational axis extending through the vessel. An inlet channel is configured at one end of the vessel through which a fluid mixture is pumped into the pressure vessel. An exit channel is provided at the opposite end of the vessel through which a select portion of the fluid mixture exits the vessel.

In a first embodiment of the present invention, the separator system includes a solid-liquid separator or clarifier. The solid-liquid separator is designed to separate particulate matter from a liquid. In this embodiment, a plurality of fins are disposed within the pressure vessel. The fins radially outwardly project from the longitudinal axis in parallel alignment with the longitudinal axis. At least a portion of each fin is disposed adjacent to the wall of the vessel so that the fins interact with the vessel wall to form a plurality of discrete flow channels that longitudinally extend through the vessel.

Radially outwardly projecting from the longitudinal axis in substantially perpendicular alignment with the longitudinal axis are a plurality of spaced apart discs. The discs intersect with the fins so as to partially block the flow channels. The discs channel the fluid flow away from the longitudinal axis of the vessel and along the vessel wall. The discs do not extend all the way to the outer wall of the pressure vessel, but leave a flow path between the perimeter of the discs and the wall of the pressure vessel.

Apart from their role in channeling fluid flow, the discs and the fins also provide structural support for each other. The discs and the fins are each configured with corresponding slots by which each fin matingly engages each disc, thereby facilitating assembly and providing mutual structural support. Hence, the discs and fins act as stays for each other as well as serving as flow diverters.

In one embodiment, underflow passages extend between select flow channels at the maximum diameter encircling the longitudinal axis. The underflow passages are configured by either truncating the end of a fin or providing holes or other orifices in or along the outer edge of a fin at desired locations. As discussed below, the underflow passages enable the separated particulate component to flow between adjacent flow channels so as to be extracted from the pressure vessel.

Disposed along the longitudinal axis of the vessel is an exit tube. The exit tube has an inlet end centrally disposed within the vessel and an outlet end fluid coupled with the exterior of the vessel. Radially outwardly projecting from the longitudinal axis are a plurality of extraction tubes. Each extraction tube has a first end fluid coupled with the inlet end of the exit tube and an opposing second end disposed a short distance from the wall of the vessel. The second end of each extraction tube is disposed within a corresponding flow channel. In one embodiment, there is an extraction tube for each flow channel. In an alternative embodiment, there may be only one extraction tube for two or more flow channels. In this latter embodiment, the underflow passages are used to provide fluid communication between flow channels that do not have an extraction tube and flow channels in which an extraction tube is disposed.

During operation of the solid-liquid separator, a liquid containing particulate matter is pump under pressure into the rotating vessel through the inlet channel. As the liquid enters the vessel, the liquid is channeled into one of the flow channels defined by the radial fins. The positioning of the disc within the flow channels forces the liquid to flow radially outward toward the vessel wall. At this location, the liquid is subject to the maximum centrifugal force produced by the rotating vessel. As a result of the applied centrifugal force, the heavier particulate matter within the liquid flows to and collects at the maximum inner diameter of the vessel encircling the longitudinal axis. The remaining liquid that is separated from the particulate matter continues to flow to the opposing end of the vessel. The clarified liquid subsequently exits the vessel through the outlet channel by way of a pressure relief valve.

The particulate matter, which is typically in the form of a fluid slurry, is removed from the vessel through the extraction tubes. That is, the particulate matter is permitted to collect within vessel until the collected particulate matter rises above the second end of the extraction tubes. At that point, a valve coupled with outlet end of the exit tube is opened. As a result of the pressure differential between the interior of the pressurized vessel and the surrounding environment, the particulate matter is sucked into the extraction tubes and then exits the vessel through the exit tube.

The solid-liquid separator is also configured to allow for the release of gases which may be introduced into the pressure vessel. Specifically, a small gas orifice is formed at the inlet end of the exit tube so as to establish fluid communication between the exit tube and vessel. Furthermore, a gas channel is formed that extends from the inlet channel to the gas orifice on the exit tube. The gas channel is formed along the longitudinal axis of the vessel and extends between the fins and through the discs. During operation, the lighter gas flows to the center of the vessel where it passes into the gas channel. When the valve is opened to facilitate removal of the particulate matter, the gas enters the exit tube through the orifice and exits with the particulate matter. In an alternative embodiment, the gas can be remove from the feed stream before it enters the solid-liquid separator by passing the stream through a commercially available needle valve or other device designed to remove gases from fluid streams.

The solid-liquid separator is particularly well suited to creating substantially quiescent solid-liquid separation cells (flow channels) between adjacent fins and against the inner wall of the rotating vessel. As such, turbulent transport phenomena is resisted and the emulsification of organic liquids, inorganic liquids and suspended solids is avoided. The solid-liquid separator also has distinct advantages over the prior art in that it significantly reduces the amount of liquid that is discharged with the solid particulate material. In particular, the percent of total water fed to the solid-liquid separator that exits as a portion of the solid particulate material is kept to a minimum.

In a second embodiment of the present invention, the separator system include a liquid-liquid separator. The liquid-liquid separator is designed to separate a mixture of two or more immiscible liquids, such as oil and water. The liquid-liquid separator is substantially identical to the solid-liquid separator discussed above. The primary distinction is that the discs have a plurality of perforations extending therethrough. The perforations enable the various liquids to pass directly through the discs as opposed to having to travel around the perimeter edge thereof. Optionally, however, the disc closest to the inlet channel of the vessel can be solid in order establish a flow regime that is directed toward the periphery of the vessel. In this embodiment, the perforated discs primarily function to support the fins.

During operation of the liquid-liquid separator, a mixture of immiscible liquids is pump under pressure into the rotating vessel through the inlet channel. As the liquid enters the vessel, the liquid is channeled into one of the flow channels defined by the radial fins. The positioning of the first solid discs within the flow channels forces the liquid to flow radially outward toward the vessel wall. As a result of the applied centrifugal force, the heavier liquid flows to and collects at the maximum inner diameter of the vessel encircling the longitudinal axis. The lighter liquid and any entrained gas flows to the center of the vessel. As a result, a boundary line is formed between the heavier liquid and the lighter liquid. The boundary line is selectively controlled within a defined range from the longitudinal axis.

During removal from the vessel, the lighter liquid and gas flow through the perforated discs and out the exit channel through a first valve. Since the gas exits with the lighter liquid, there is no need for a gas orifice communicating with the exit tube. The heavier liquid is drawn through the extraction tubes and exits through the exit tube by way of a second valve.

The liquid-liquid separator is operated under an inventive pressure differential system that maintains the boundary line, such as an oil/water interface, within a preferred range of radial distances from the longitudinal axis of the pressure vessel. Specifically, the inventive system allows the pressure vessel to handle catastrophic load disturbances, such as a shift from an oil/water mix to either 100% oil or 100% water, while maintaining the boundary line within the desired range.

It is therefore an object of the invention to provide a separator system that overcomes the problems of the prior art. It is also an object of one embodiment of the present invention to provide a separator system that accomplishes solid-liquid separation in a rotating vessel by use of centrifugal force and by directing the flow of the particulate-containing material. It is also an object of one embodiment of the invention to provide a separator system that accomplishes solid-liquid separation at a rate that is a quantum increase compared to traditional thickeners and high-rate thickeners while occupying a footprint that is practical for virtually any application. Another object of one embodiment of the present invention to provide a separator system that separates solids and liquids such that the solids portion has a liquid content of the total particulate-containing liquid feed material that is about five percent or less.

It is also an object of invention to provide an liquid-liquid separator system that overcomes the problems of the prior art. It is therefore an object of one embodiment of the invention to provide a separator system that accomplishes a liquid-liquid separation in a rotating pressure vessel by use of centrifugal force and applied pressure. It is also an object of one embodiment of the invention to provide a separator system that accomplishes liquid-liquid separation at a rate that is a quantum increase compared to traditional hydrocyclone separators while maintaining the ability to handle catastrophic load disturbances.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 is a cross-sectional view of an embodiment of the solid-liquid separator of the present invention;

FIGS. 4A–B are cross-sectional views taken along line 4A—4A and 4B—4B of FIG. 3 respectively;

DETAILED DESCRIPTION OF THE PREFERRED EMBODIMENTS

The present invention relates to a system for clarifying water that has been contaminated with particulate matter, including organic and inorganic contaminants. The present invention also relates to a system for separating immiscible liquids such as an oil/water mixture. Reference is now made to the drawings wherein like reference numbers refer to like unit operations or structures. The drawings are understood to be diagrammatic and/or schematic and are not necessarily drawn to scale nor are they to be limiting of the spirit and scope of the present invention.

Figure 1:
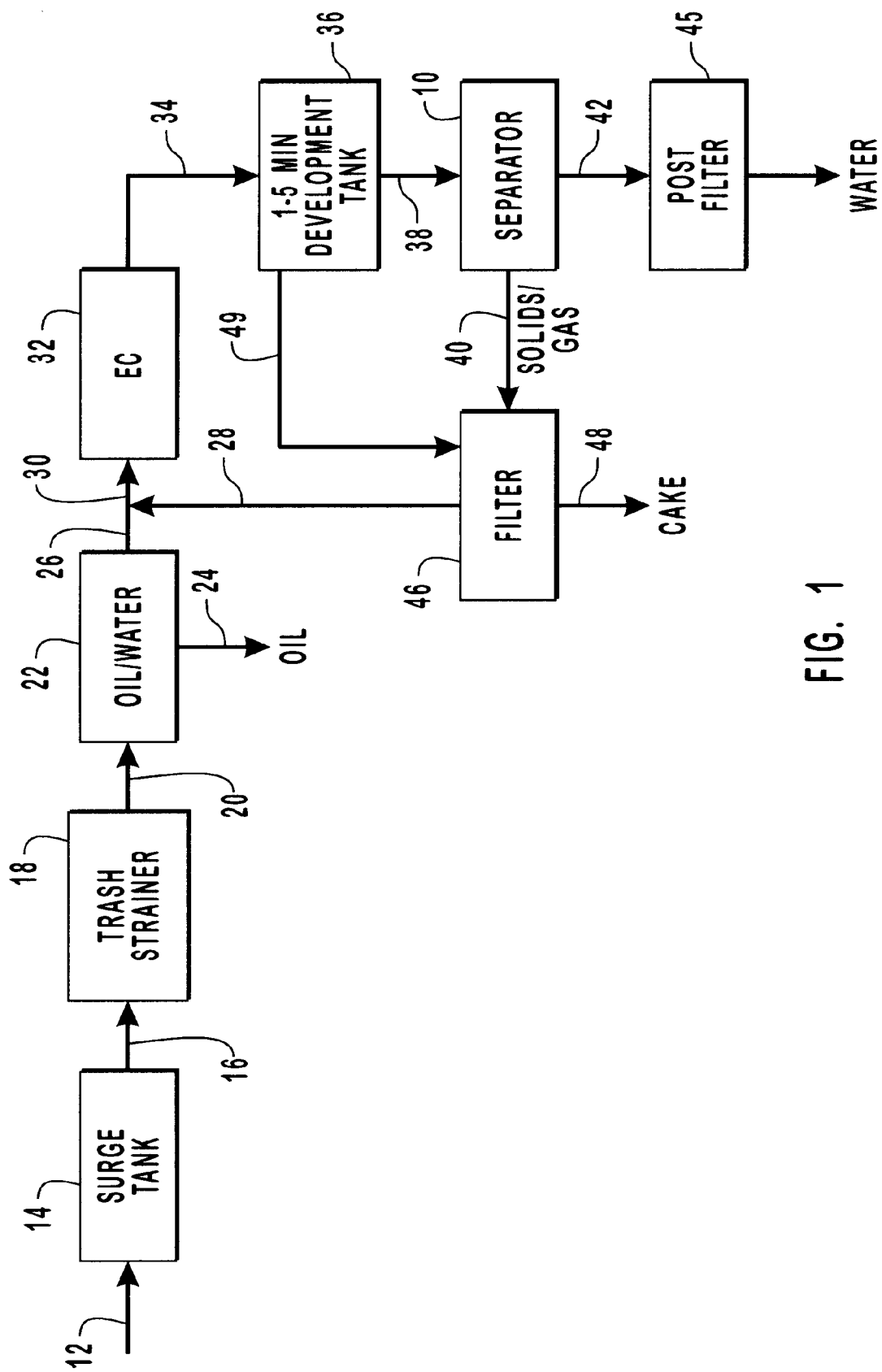
FIG. 1 is a block diagram overview of a process that uses the solid-liquid separator of the present invention.

FIG. 1 is a block diagram overview of a process that uses the inventive solid-liquid separator. As illustrated in FIG. 1, a solid-liquid separator 10 is connected with a variety of other processing components. One configuration may include a feed stream 12 which includes a flow of material to be treated. Feed stream 12 may consist of a variety of compositions, such as water which includes pollutants like oil, bacterial contaminants, dissolved metals and minerals, and colloidally suspended solids. Feed stream 12 may originate from industrial facilities, animal product processing facilities, sewage treatment, municipal water treatment, the petroleum industry, etc.

Feed stream 12 supplies surge tank 14 which acts as a holding tank to store a large inflow of water. Surge tank 14 may include any commercially available surge tank, an earthen pond or other liquid holding vessel. From surge tank 14, the fluid follows a flow path 16 to a trash strainer 18 for eliminating oversized particles which could clog the system. Exiting from trash strainer 18, the fluid follows flow path 20 into an oil/water separator 22 that divides an oil stream 24 from a water stream 26. While a variety of oil/water separators may be employed, in one embodiment an oil/water separator such as those separators disclosed in U.S. Pat. Nos. 5,387,342, 5,582,724 and 5,464,536 can be employed, which patents are incorporated herein by this reference for all they disclose.

Water stream 26 may be combined with a filter water stream 28 as a supply stream 30 for an electrostatic coagulator 32. Electrostatic coagulator 32 operates to electrically sterilize the water by killing any living organisms, break down colloidal suspension of impurities, and coalesce impurities into a flocculent. Such systems are available from Scott Powell Water Systems, Inc. of Denver, Colo.

A coagulated effluent stream 34 supplies a development tank 36 that typically has a residence time of from about one to five minutes or longer. While in the development tank, the particle size of the flocculent grows. The development tank effluent stream 38 supplies the solid-liquid separator 10 of the present invention. Solid-liquid separator 10 generates an underflow stream 40 constituting the particulate matter and gas that has been removed from the effluent stream 38, and an overflow stream 42 constituting the clarified water or other liquid. The clarified water in overflow stream 42 is discharged either directly or through a post filter 45 to the environment. Underflow stream 40 is supplied to a filter 46 from which filter water stream 28 and a filter cake 48 are generated.

In one embodiment, gas and residual oil collected in the top of development tank 36 can be directly drawn off through line 49 to filter 46. It is also appreciated that oil/water separator 22, electrostatic coagulator 32, development tank 36, separator 10, and filter 46 can each be operated under an elevated pressure, such as by the application of a pump, so as to facilitate desired flows through the system. The pressure may vary in one or more of the components 22, 32, 36, 10 and 46 so as to control flow in desired directions.

Figure 2:
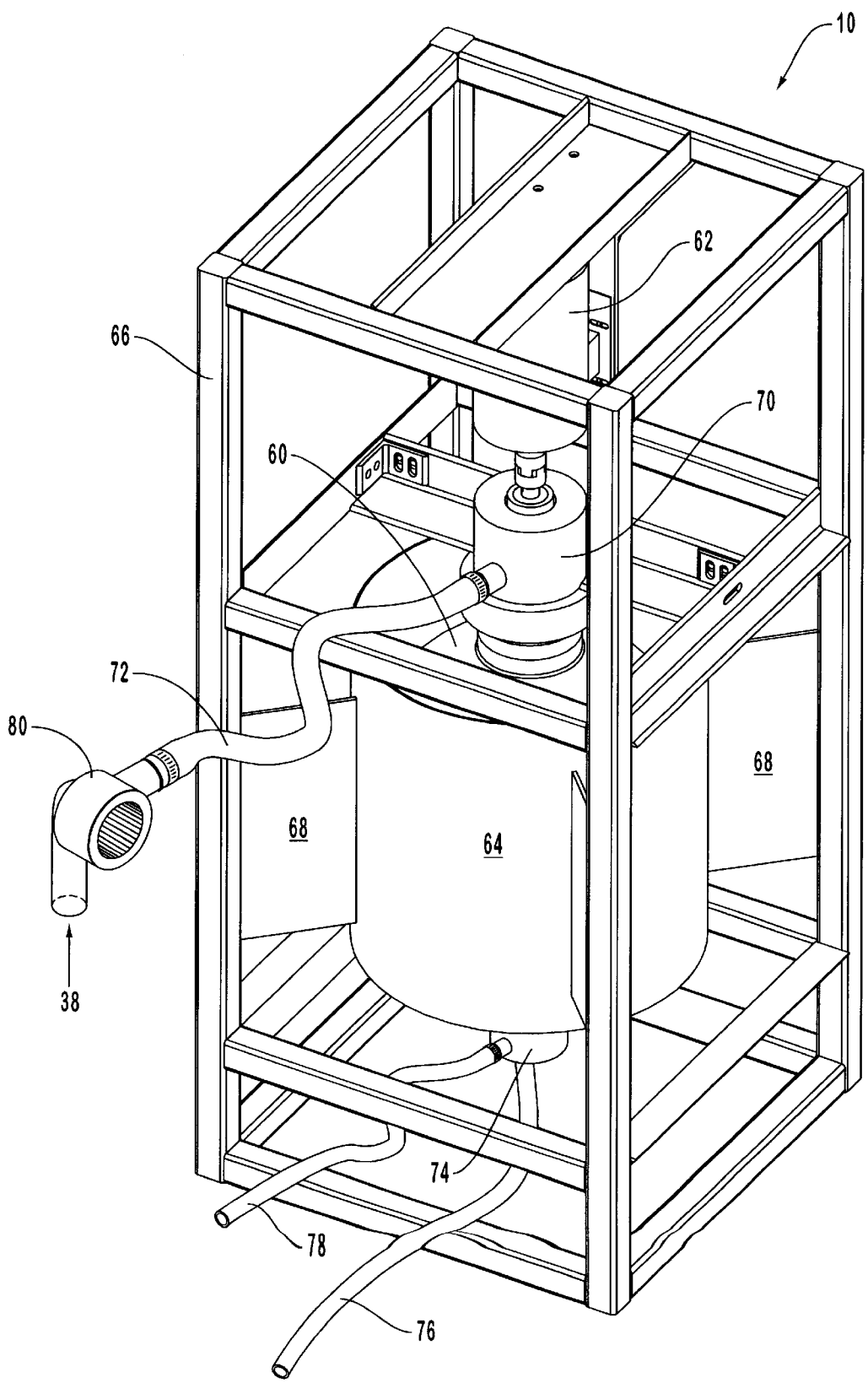
FIG. 2 is a perspective view of one embodiment of the solid-liquid separator of the present invention.

In FIG. 2, one embodiment of the solid-liquid separator 10 of the present invention is illustrated. The solid-liquid separator 10 includes a pressure vessel 60 which is driven by a motor 62. Although the solid-liquid separator of the present invention can be manufactured in a variety of sizes, the depicted embodiment is designed to process approximately 40 liters/minute. In such an embodiment, a 2.5 horsepower, 3440 RPM electric motor can be utilized.

The pressure vessel 60 is preferably mounted within a guard 64. Guard 64 merely provides a shroud or housing as a safety mechanism to keep people and objects away from the spinning pressure vessel 60. In the illustrated embodiment, a frame assembly 66 is provided to which the guard 64 is mounted via mounting fins 68. One of skill in the art will, of course, appreciate that the guard 64 may be configured and attached to the frame assembly 66 in a variety of ways.

Frame assembly 66 is further configured to provide support to the motor 62 and the bearing structure which supports the pressure vessel 60. The solid-liquid separator 10 includes a stationary inlet housing 70 configured to receive an inlet line 72. Similarly, a stationary outlet housing 74 is provided on the opposite end of the pressure vessel 60 to which is attached an underflow outlet line 76 and an overflow outlet line 78.

A pump 80 is used to receive the effluent stream 38 and provide the stream 38 to the solid-liquid separator 10 through inlet line 72. Pump 80 pressurizes effluent stream 38 in inlet line 72 such that the solid-liquid separator 10 operates under such pressure. Hence, pump 80 must be capable of pumping effluent stream 38 at the flow rate capacity of the solid-liquid separator 10 while maintaining a desired pressure. In one embodiment, the pump 80 maintains the effluent stream 38 at a pressure in a range between about 3 psi ($2.07 \times 10^4$ Pa) to about 500 psi ($3.45 \times 10^6$ Pa) with about 15 psi ($1.03 \times 10^5$ Pa) to about 60 psi ($4.14 \times 10^5$ Pa) being more preferred. Pump 80 also produces flow rates in a range between about 3 liters/minute to about 1,000 liters/minute. Any commercially available pump 80 which can create the above pressures and the desired flow rates will function for the desired purpose.

As illustrated in FIG. 3, the pressure vessel 60 is mounted for rotation about rotational axis 90 which also coincides with the longitudinal axis of the solid-liquid separator 10. Pressure vessel 60 includes a peripheral wall 92 having an interior surface 93 bounding a chamber 95. In the embodiment depicted, chamber 95 is in the shape of a sphere, although other configurations may be utilized. Because vessel 60 is mounted for rotation about axis 90, pressure vessel 60 will generally include a geometry comprising a body of rotation about axis 90.

Additionally, it is desirable, although not required, that the walls of pressure vessel 60 slope radially outward towards an equator 97 having a maximum diameter that encircles longitudinal axis 90. Thus, although a pressure vessel with spherical walls 92 is one desired embodiment because of its efficient pressure bearing qualities, other curved-wall vessels, such as those having an oval, elliptical, or symmetrically irregular shape may be employed. Furthermore, straight-line configurations such as two truncated cones with their wide ends affixed together can be used. Similarly, a vessel having a cylindrical configuration at the edges and a center which is formed by truncated cones connected together can be used. In yet other embodiments, the vessel 60 need not have outwardly sloping walls. For example, vessel 60 can be cylindrical or have a polygonal transverse cross section.

Pressure vessel 60 may be made out of a variety of materials including stainless steel, plastics, filament wound structures and other conventional materials. In one embodiment, pressure vessel 60 is capable of withstanding pressures in a range between about 1 psi ($6.90 \times 10^3$ Pa) to about 500 psi ($3.45 \times 10^6$ Pa) with about 10 psi ($6.90 \times 10^4$ Pa) to about 100 psi ($6.90 \times 10^5$ Pa) being more preferred. In the embodiment depicted, pressure vessel 60 is made out of stainless steel and has two halves for ease of manufacture and construction. The two halves are secured together such as by welding, bolts, or other conventional methods such that a seam is formed at equator 97 of vessel 60.

As illustrated in FIG. 3, solid-liquid separator 10 includes a drive shaft 94 at its inlet end 96 which is rigidly mounted to the vessel 60. Drive shaft 94 is configured to engage motor 62 (FIG. 2) as is known in the art. Drive shaft 94 is mounted within a hollow shaft 98 which is secured within inlet mounting collar 100. Inlet mounting collar 100, in turn, is secured to vessel 60 within a plurality of mounting bolts 102, in a manner known to one of skill in the art.

The drive shaft 94, hollow shaft 98, and inlet mounting collar 100 are thus all rigidly secured to each other and to vessel 60 by any of those methods known in the art, such as by welding or the use of bolts, such as mounting bolts 102 which engage an inlet mounting flange 104. These components comprise a drive assembly which is rigidly affixed to vessel 60 and, consequently, rotate with vessel 60.

The drive assembly is configured to engage inlet housing 70. Inlet housing 70 supports the drive assembly with an inlet bearing assembly 106 which, in this embodiment, engages the inlet mounting collar 100. Inlet bearing assembly 106 is a sealed ball bearing assembly resting in a pillow such as will be well known to one of skill in the art.

Inlet housing 70 is configured with a feed stream inlet 114 which is configured for receiving inlet line 72 (FIG. 2) via any of those known attachment methods known in the art for providing fluid communication. As illustrated with reference to FIGS. 3 and 4A, inlet housing 70 is further configured with an annular manifold cavity 108 which surrounds hollow shaft 98. Hollow shaft 98 includes a plurality of access ports 10. Mechanical pump seals 112 are provided between the hollow shaft 98 and the inlet housing 70 on each side of the manifold cavity 108 to thereby provide a fluid seal while allowing relative rotational movement between the inlet stationary housing 70 and the hollow shaft 98. Mechanical pump seals such as are available from A. W. Chesterton Co. of Stoneham, Mass. function for the desired purpose.

With continued reference to FIG. 3, the support structure for vessel 60 at outlet end 120 is illustrated and described. As at inlet end 96, the vessel 60 at outlet end 120 is similarly configured with an outlet mounting flange 122. An outlet mounting collar 124 is attached to the outlet mounting flange 122 with a number of bolts 102. The outlet mounting collar 124 is supported on an outlet housing 74 via an outlet bearing assembly 126.

The outlet housing 74 and the outlet mounting collar 124 are each configured with a hollow interior for receiving an underflow exit tube 128 having a removal channel 130 therein. As illustrated in FIG. 4B, the hollow interior of the outlet housing 74 and the outlet mounting collar 124 and the exit tube 128 are configured such that an annular effluent channel 132 is defined therebetween. Effluent channel 132 extends exteriorly of exit tube 128 and is in fluid communication with an overflow outlet 134 configured in outlet housing 74. Referring again to FIG. 3, overflow outlet 134 includes a pressure relief valve 136 for maintaining pressure within the vessel 60. Pressure relief valve 136 may be a one-way, spring-loaded fail shut valve in which the spring force must be overcome by a sufficient fluid pressure to force the valve open.

An outlet end 129 of exit tube 128 is overfit with mechanical pump seal 138. The opposing end of mechanical pump seal 138 is rigidly affixed within a circular step configured in the interior end of outlet housing 74. Thus, mechanical pump seal 138 acts as a fluid barrier between removal channel 130 and effluent channel 132 and allows for relative rotational movement between exit tube 128 and outlet housing 74. The outlet end of the outlet housing 74 is further configured with an exit orifice 140 which engages underflow outlet line 76. Underflow outlet line 76 is accessed through an underflow exit valve 148 which may be a standard or solenoid valve, such as a ball valve that is commercially available.

Exit tube 128 also has an inlet end 131. In one embodiment, a plug 162 is received within the opening at inlet end 131. A gas escape orifice 164 extends through plug 162 so as to establish fluid communication between the center of chamber 95 and channel 130 extending through exit tube 128. Gas escape orifice 164 typically has a diameter in a range between about 0.02 inches (0.05 cm) to about 0.5 inches (1.3 cm) with about 0.02 inches (0.05 cm) to about 0.125 inches (0.3 cm) being more preferred. In an alternative embodiment, inlet end 131 can simply be formed with a constricted orifice that communicates with channel 130, thereby precluding the need for plug 162.

With continued reference to FIG. 3, exit tube 128 extends to the center of vessel 60. Solid-liquid separator 10 also includes a plurality of radial underflow extraction tubes 160. Each extraction tube 160 has a first end 161 and an opposing second end 163. Each first end 161 is in fluid communication with exit tube 128 at inlet end 131 thereof. Extending through each extraction tube 160 is a channel having a diameter in a range from about 0.06 inches (0.15 cm) to about 2.0 inches (5 cm) with about 0.125 inches (0.3 cm) to about 0.5 inches (1.3 cm) being more preferred. In one embodiment, eight extraction tubes 160 are employed, each spaced 45 degrees from the adjacent tube. In alternative embodiments, any number of extraction tubes 160 can be used. In one embodiment, a typical number of extraction tubes 160 ranges from about 2 to about 144 with about 4 to about 24 being more preferred.

In yet another embodiment, extraction tubes 160 need not radially outwardly project from exit tube 128 such that extraction tubes 160 are perpendicular to exit tube 128. Rather, extraction tubes 160 can outwardly project from exit tube 128 at an angled orientation. For example, in one embodiment, the inside angle between each extraction tube 160 and exit tube 128 may be in a range between about 90° to about 160°. In the embodiments where the inside angle is greater than 90°, exit tube 128 can be shorter so that inlet end 131 of exit tube 128 couples with first end 161 of each extraction tube 160.

Extraction tubes 160 each extend outwardly an equal distance from the longitudinal axis 90 of the solid-liquid separator. Each extraction tube 160 has an opening 166 at its second end 163 for receiving separated particulate matter. In operation, the extraction tubes 160, as further explained below, assist in defining a boundary line between the collected particulate matter and the clarified liquid. Thus, the length of the extraction tubes 160 is set to provide a predetermined boundary line within vessel 60. In one embodiment in which vessel 60 has a maximum inner diameter of 19 inches at equator 97, extraction tubes 160 are configured to leave a 0.25 inch (0.65 cm) space between the opening 166 in tubes 160 and the wall 92 of vessel 60. In alternative embodiments, including those of different sized vessels, the space between the opening 166 in extraction tubes 160 and the wall 92 of vessel 60 is typically in a range between about 0.125 inches (0.3 cm) to about 2 inches (5 cm) with about 0.25 inches (0.6 cm) to about 1 inch (2.5 cm) being more preferred.

Vessel 60 is also configured with a plurality of fins and discs for channeling fluid flow through vessel 60. One embodiment of the solid-liquid separator 10 includes a center disc 170, positioned in the center of vessel 60 and oriented perpendicular to longitudinal axis 90, as illustrated in FIG. 3. Center disc 170 is configured with a central orifice which fits over plug 162. Center disc 170 extends in a circular configuration radially outward from plug 162. The outer edge 172 of disc 170 is circular (following the curvature of vessel 60) and is configured to provide an axial flow passage 174 between the edge 172 of the disc 170 and the wall 92 of the vessel 60. Flow passage 174 extends annularly about axis 90. Outer edge 172 is typically, although not necessarily, disposed radially inward from opening 166 of extraction tubes 160. In one embodiment, the distance between edge 172 of disc 170 and wall 92 of vessel 60 is in a range between about 0.5 inches (1.3 cm) to about 4 inches (10 cm) with about (0.8 inches (2 cm) to about 1.2 inches (3 cm) being more preferred.

The depicted embodiment also includes four additional discs 176, 178, 202 and 204. Discs 176 and 202 are positioned on the inlet side of vessel 60 with discs 178 and 204 positioned on the outlet side. Discs 176, 178, 202 and 204 are used in part to facilitate assembly of the solid-liquid separator 10 and to provide structural support during operation thereof. Alternatively, the solid-liquid separator 10 can be assembled with fewer or greater numbers of assembly discs. It is also envisioned that the inventive solid-liquid separator 10 can be constructed without discs by securing the fins, as discussed below, directly to exit tube 128 and/or wall 92 of vessel 60.

Figure 5:
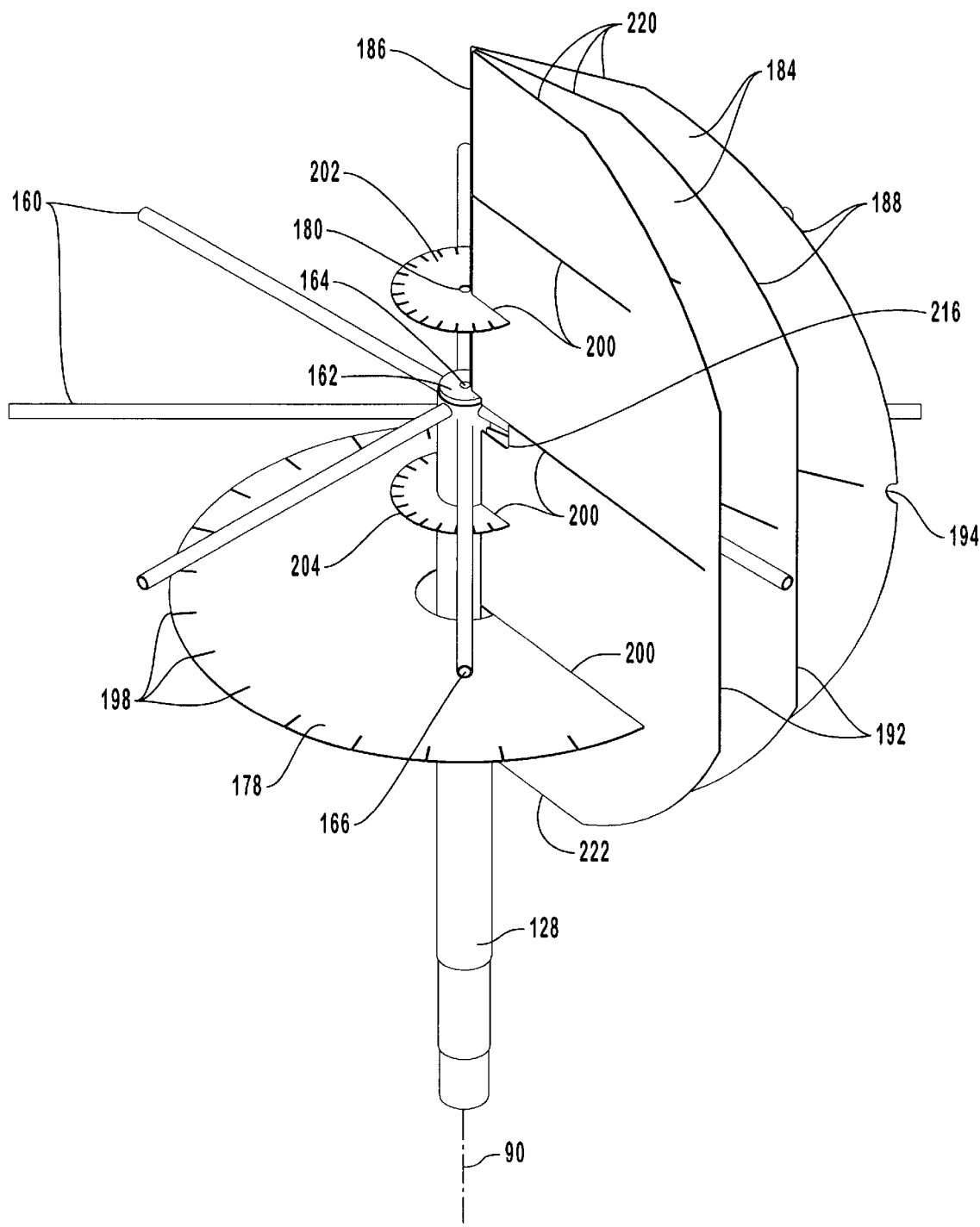
FIG. 5 is a perspective view of a partial assembly of the interior of the vessel of an embodiment of the solid-liquid separator of the present invention, revealing a portion of the fin and disc assembly.
Figure 6:
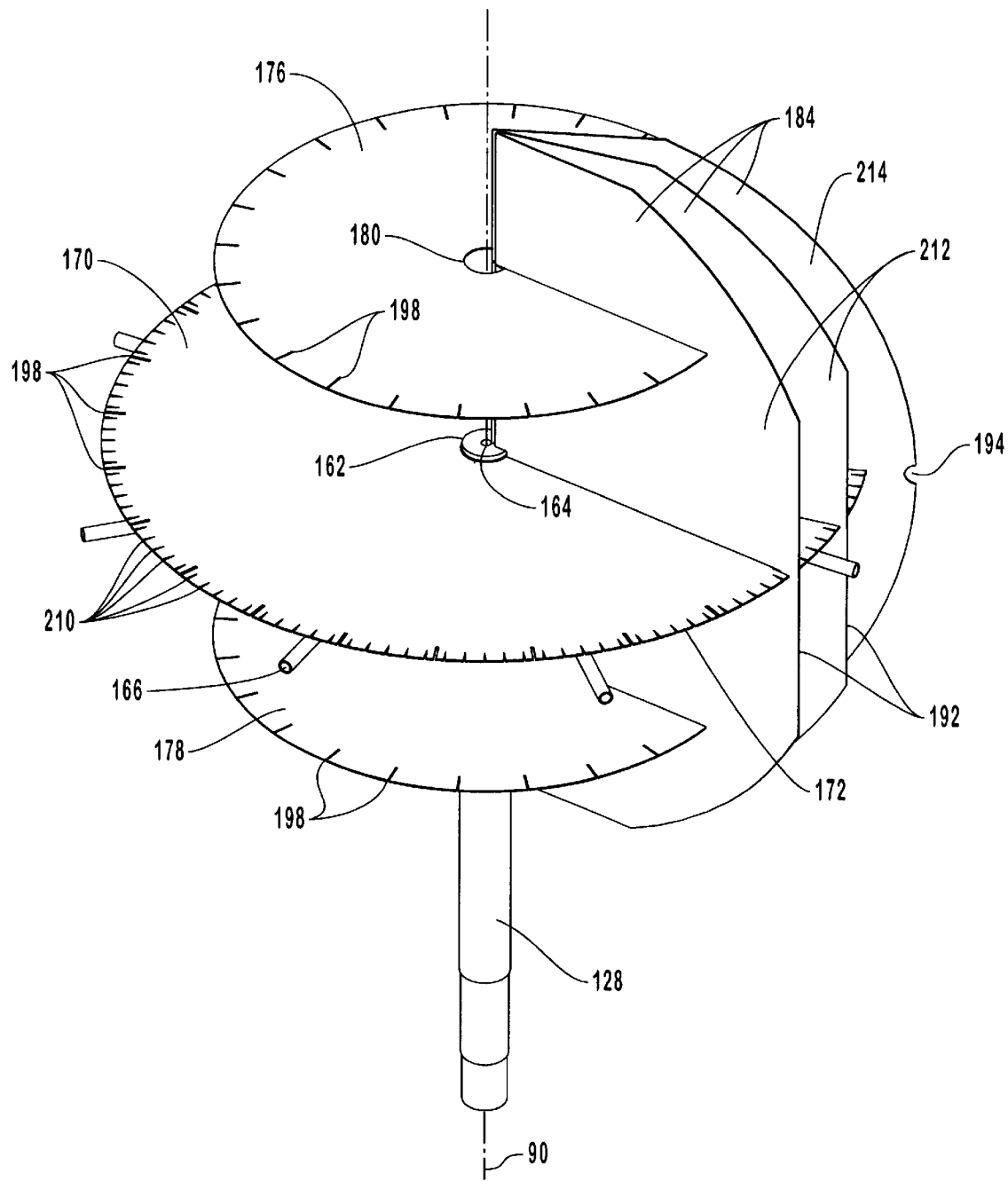
FIG. 6 is a perspective view of a partial assembly of the interior of the vessel of the solid-liquid separator illustrated in FIG. 3, revealing a more complete portion of the fin and disc assembly.

As illustrated in FIGS. 5 and 6, discs 176 and 202 include central orifices 180 which allow gas that collects at the center of the vessel 60 to be extracted. Discs 178 and 204 are similarly configured with central orifices 182 slightly larger than the outside diameter of exit tube 128, thereby accommodating passage therethrough of underflow tube 128. V-notches 210 may be formed, such as by being laser cut, into outer edge 172 of disc 170. These v-notches minimize the disturbance of the collected particulate matter as the clarified water flows around disc 170. In one embodiment, these v-notches 210 are cut at the edge 172 of disc 170 having a width in a range between about 0.1 inch (0.25 cm) to about 1 inch (2.5 cm) and a depth in a range between about 0.1 inch (0.25 cm) to about 1 inch (2.5 cm). The number of v-notches 210 that are cut into center disc 170 between each pair of fins 184 is typically in a range between about three notches to about eight notches. Alternatively, the number and size of these v-notches 210 can be increased or reduced.

Referring now to FIG. 5, solid-liquid separator 10 also includes a plurality of radial fins 184. Each fin 184 has an inside edge 186 which is generally parallel to the longitudinal axis 90 and an outside edge 188 which generally follows the curvature of the vessel 60. Thus, in the configuration illustrated herein, in which a spherical vessel 60 is employed, the outside edge 188 of the fins 184 has a semi-circular configuration.

Figure 7A:
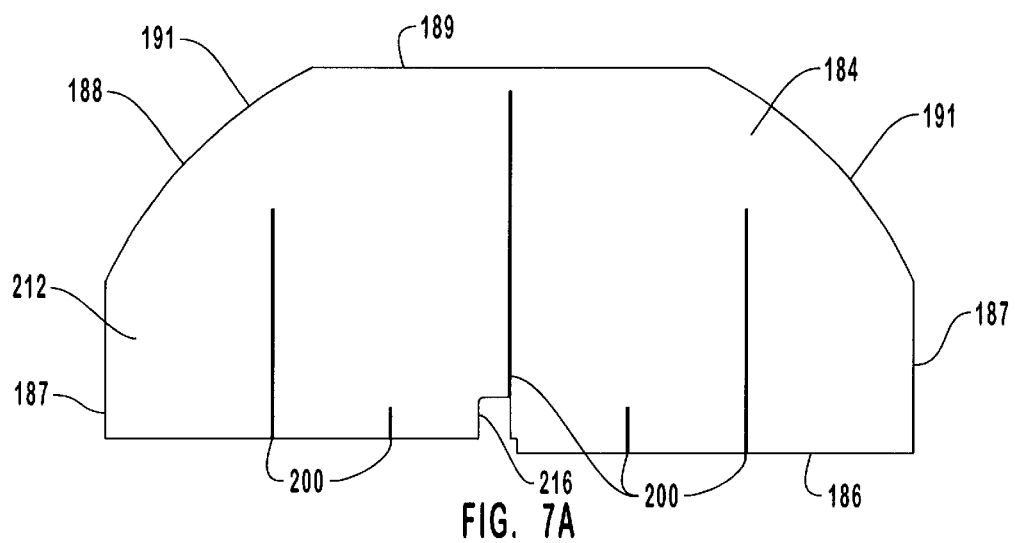
FIGS. 7A, B and C are plan views of fin embodiments and an alternative fin embodiment which may be utilized in the solid-liquid separator of the present invention.
Figure 8:
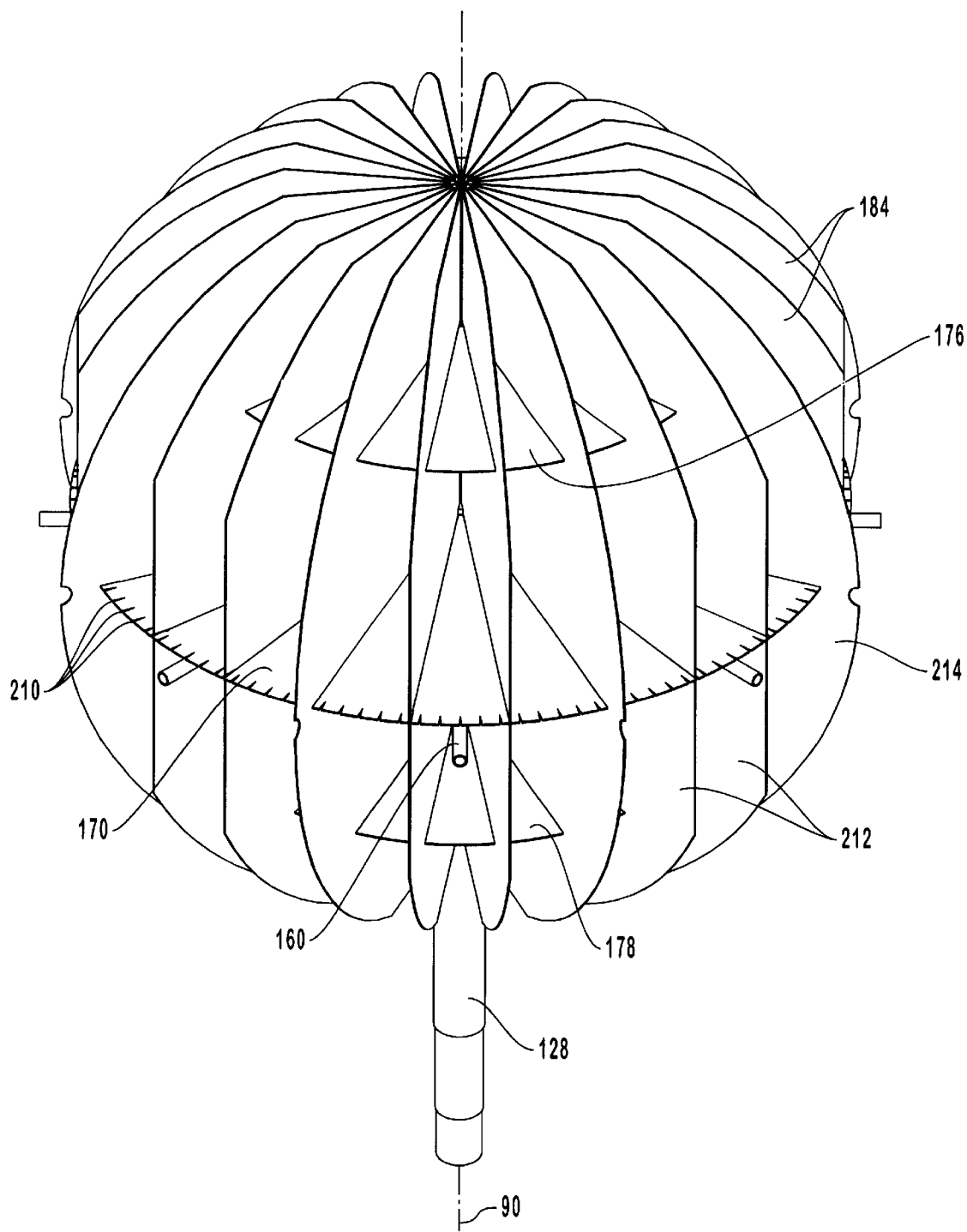
FIG. 8 is a perspective view of a partial assembly of the interior of the vessel of the solid-liquid separator illustrated in FIG. 3, revealing a completed fin and disc assembly.

In the embodiment illustrated in FIG. 8, two types of fins 184 are used: trimmed fins 212 and untrimmed fins 214. As depicted in FIG. 7A, each trimmed fin 212 includes a substantially flat inside edge 186 and an opposing outside edge 188. Outside edge 188 includes a substantially flat side portion 187 orthogonally projecting from each end of inside edge 186, a centrally disposed substantially flat nose portion 189 disposed substantially parallel to inside edge 186, and a curved shoulder portion 191 extending from each side portion 187 to opposing ends of nose portion 189.

Figure 7B:
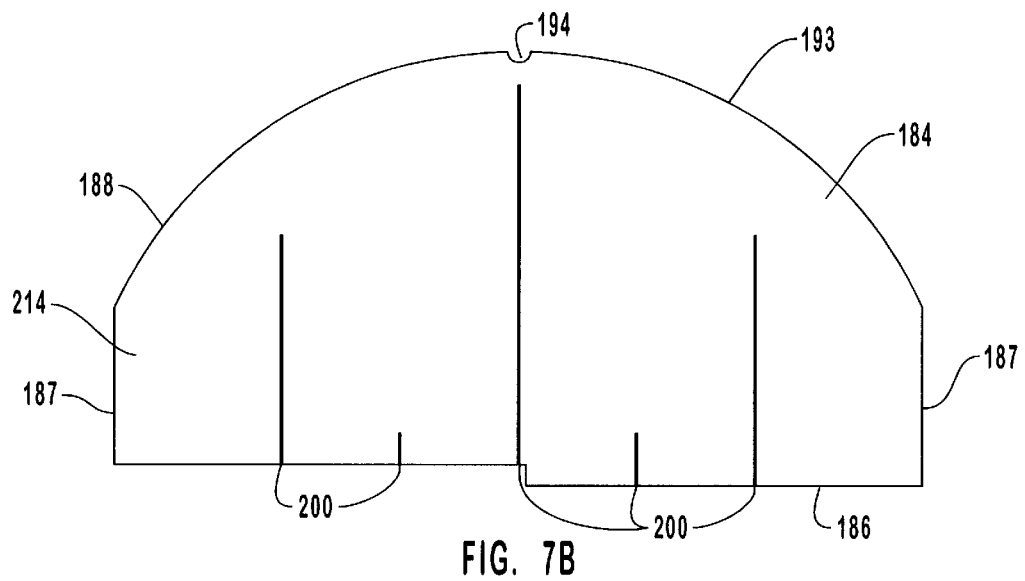

As illustrated in FIG. 7B, each untrimmed fin 214 includes a substantially flat inside edge 186 and an opposing outside edge 188. Outside edge 188 includes a substantially flat side portion 187 orthogonally projecting from each end of inside edge 186 and a curved face portion 193 extending between each side portion 187. A centrally disposed semi-circular notch 194 is formed on face portion 193.

Figure 7C:
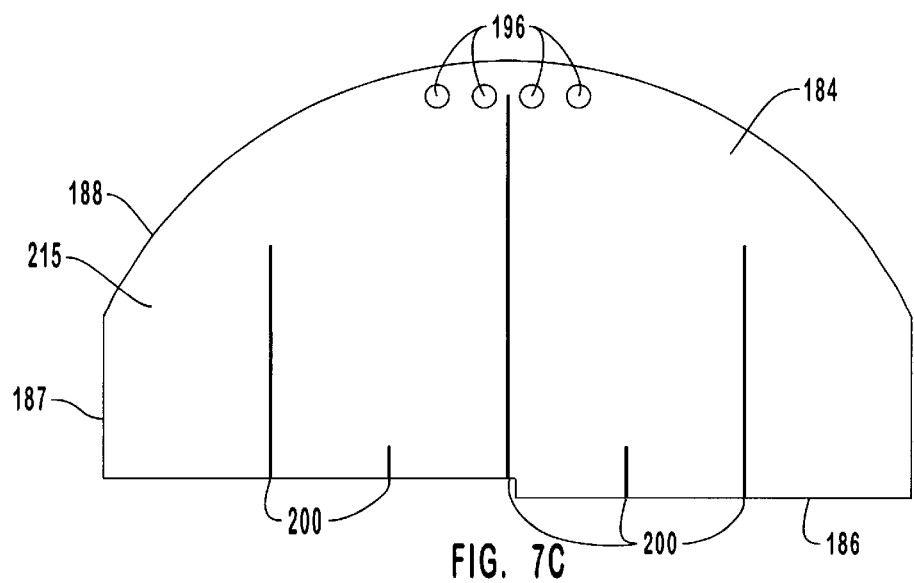

An alternative fin 215 is illustrated in FIG. 7C. Fin 215 has substantially the same configuration as untrimmed fin 214 except that notch 194 is replaced with holes 196 extending through fin 215. Such holes 196 typically have a diameter in a range between about 0.5 inches (1.3 cm) to about 1.5 inches (3.8 cm).

Fins 184 are positioned within chamber 95 of vessel 60 perpendicularly to discs 170, 176, 178, 202 and 204 as best illustrated in FIGS. 5 and 6. Each disc is provided with a slot 198 which corresponds to each fin 184. Slots 200, which correspond to each disc 170, 176, 178, 202 and 204, are also configured in each fin 184. Fins 184 and discs 170, 176, 178, 202 and 204 are in one embodiment formed of stainless steel but can also be formed from plastics, composites, and other sufficiently strong material. Slots 198 and 200 may be formed using any conventional method such as by laser cutting. Slots 198 and 200 are configured to allow the fins and discs to engage each other in a slip fit, mating relationship. Thus, slots 198 configured in discs 170, 176, 178, 202 and 204 have a width at least as great as the thickness of fins 184. Similarly, slots 200 configured in fins 184, have a width at least as great as the thickness of the discs 170, 176, 178, 202 and 204 which correspond to these slots.

The fin and disc assembly within vessel 60 is thus assembled as illustrated in FIG. 5 by positioning outlet discs 204 and 178 over exit tube 128. Center disc 170 as seen in FIG. 6 is then placed about plug 162 and some fins 184 are engaged into their corresponding slots on the discs 170 and 178 while simultaneously engaging the discs with the corresponding slots on the fins 184. When a fin 184 is thus placed into mating engagement with a disc, virtually all relative movement between the disc and the fin is prohibited. Inlet discs 176 and 202 are then placed into mating engagement with the slots 200 on the fins 184. With all five discs 170, 176, 178, 202 and 204 now in position, the remaining fins are installed by sliding them radially into position, until the interior configuration of the vessel 60 is complete as illustrated in FIG. 8. Slots 198 and 200 are simply one way of securing the fins and discs together. In alternative embodiments, the fins and discs can be welded, clamped, integrally molded, or otherwise secured together using conventional methods.

Figure 9:
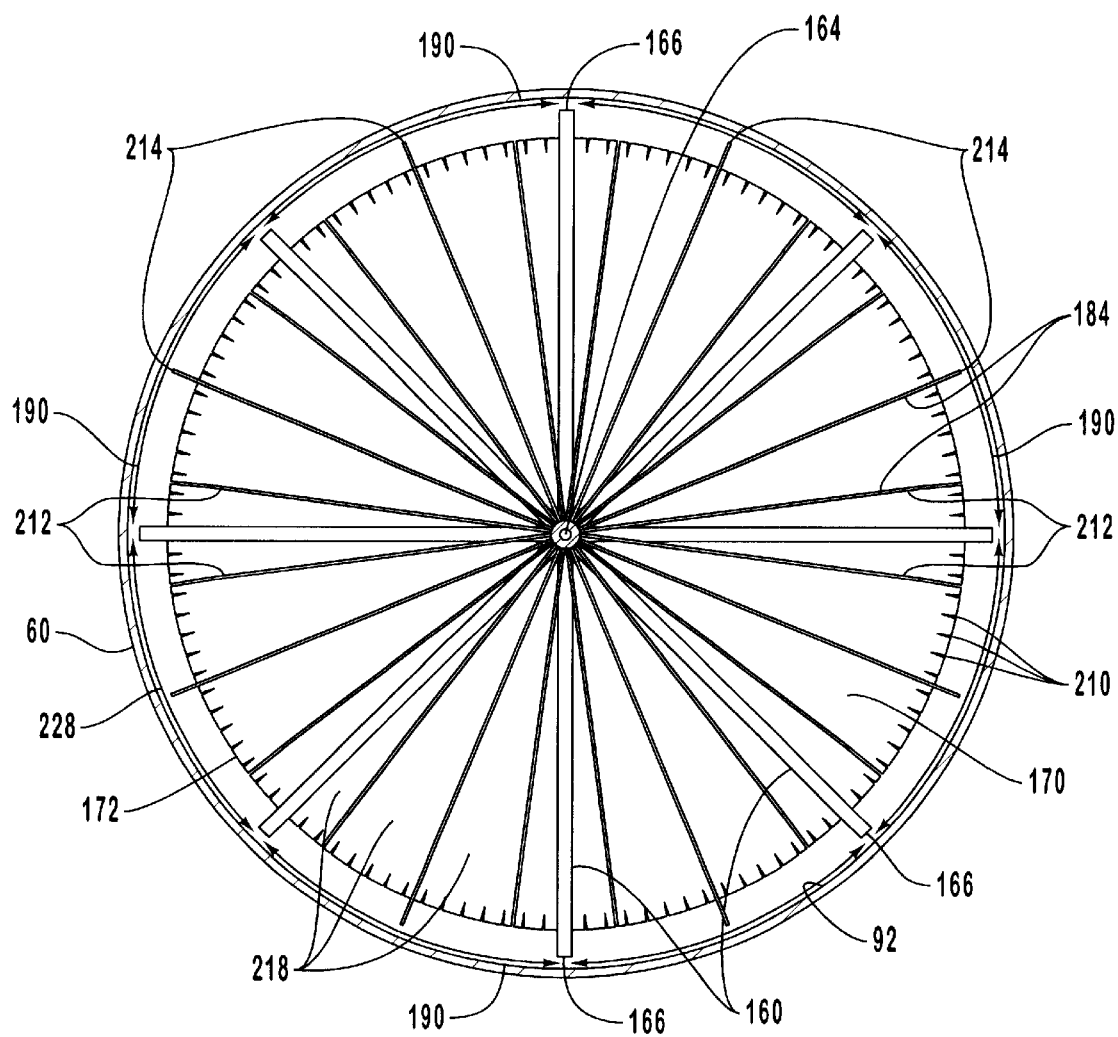
FIG. 9 is an elevational cross-sectional view taken along line 9—9 of FIG. 3.

In the depicted embodiment, twenty four fins 184 are utilized in vessel 60, as illustrated in FIGS. 8 and 9. In alternative embodiments, the number of fins 184 is typically in a range between about 8 to about 144 with about 12 to about 48 being more preferred. As best depicted in FIGS. 3, 8, and 9, the assembled fins 184 radially outwardly project from longitudinal axis 90 in substantially parallel alignment with longitudinal axis 90. Each inside edge 186 is spaced apart from the center of longitudinal axis 90 so that a channel 219, depicted in FIG. 3, is formed that extends from inlet end 96 to gas escape orifice 164. Channel 219 has a diameter typically in a range between about 0.25 inches (0.6 cm) to about 2 inches (5 cm) with about 0.25 inches (0.6 cm) to about 1 inch (2.5 cm) being more preferred. As illustrated in FIGS. 7A and 7B the inside edge 186 of each fin 184 is cut to prevent interference with exit tube 128 and gas escape plug 162.

To accommodate the eight radial extraction tubes 160, trimmed fins 212 are modified with a central notch 216 as illustrated in FIG. 5. The notch 216 is sized to allow some degree of intersection of the trimmed fins 212 with the extraction tubes 160, as illustrated in FIG. 9. Hence, in the depicted embodiment, sixteen trimmed fins 212 as modified with a rotch 216 are utilized in combination with eight untrimmed fins 214 which have not been so modified.

In an alternative embodiment, it is appreciated that fins 184 need not radially outwardly project in alignment with longitudinal axis 90. Rather, inside edge 186 of each fin 184 can be offset from alignment longitudinal axis 90 and still be retained in position by the discs.

With the fins and discs assembled about exit tube 128 as illustrated in FIG. 8, the internal assembly is enclosed within chamber 95 of vessel 60. In one embodiment, vessel 60 is comprised of two halves which are secured together, such as by welding or bolting with a seal such as a gasket or o-ring disposed therebetween. By covering the internal assembly of FIG. 8 within wall 92 of vessel 60, the fins and discs become locked to each other in relative engagement and no welding is needed to hold them secure.

Figure 10:
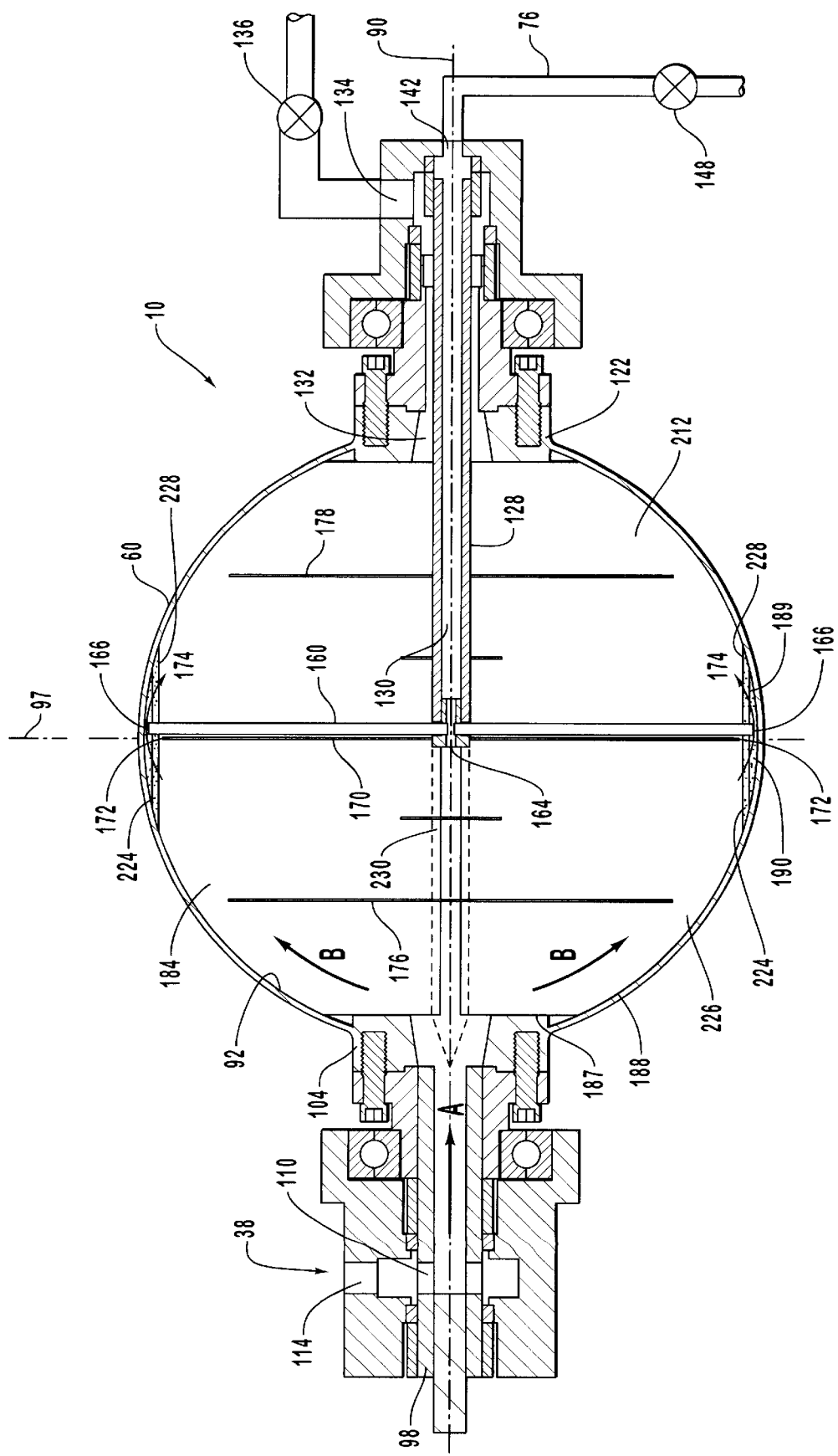
FIG. 10 is a cross-sectional view of the solid-liquid separator illustrated in FIG. 3 showing the solid-liquid separator in operation.

Specifically, as depicted in FIG. 10, flat side portions 187 of each fin 184 are disposed adjacent to mounting flanges 104 and 122. Curved shoulder portions 188 of trimmed fins 212 are disposed adjacent to wall 92. Similarly, curved face portion 193 of untrimmed fins 214 are also disposed adjacent to wall 92. Side portions 187, shoulder portions 188, and face portion 193 of fins 184 can be directly biased against vessel 60. Alternatively, a small gap, typically less than about ¼ inch, can be formed between vessel 60 and portions 187, 188, and 193. As illustrated in FIG. 9, the positioning of fins 184 adjacent to wall 92 results in the formation of a plurality of discrete flow channels 218 through vessel 60 along the longitudinal axis. Each flow channel 218, however, is partially blocked by the intersection of the various discs 170, 176, 178, 202, and 204. As a result of the discs, fluid traveling through flow channels 218 is required to flow around the outer edge of the discs.

Returning to FIG. 10, an underflow passage 190 is formed between flat nose portion 189 of trimmed fins 214 and wall 92. Underflow passage 190 enables fluid to flow between discrete flow channels 218 at equator 97. In one embodiment, the maximum gap between flat nose portion 189 of trimmed fin 214 and wall 92 is in a range between about 0.125 inches (0.3 cm) to about 2 inches (5 cm) with about 0.25 inches (0.6 cm) to about 1 inch (2.5 cm) being more preferred. In one embodiment, flat nose portion 189 of each fin 184 is positioned radially inward from opening 166 of each corresponding extraction tube 160.

It is of course envisioned that fins 184 can be formed in a variety of different configurations to facilitate underflow passage 190 between flow channels 218. For example, trimmed fins 212 can be replaced with alternative fins 215. In this embodiment, holes 196 facilitate underflow passage 190. In yet other embodiments, notches, slots, holes, grooves, and the like can be formed in a fin 184 to facilitate underflow passage 190.

Notch 194 (FIG. 7B) formed in untrimmed fins 214 is designed to perform two functions. First, in an embodiment where a seam is formed at equator 97, such as an inside flange, notch 194 provides space to receive the seam. Notch 194 also functions to allow at least some flow between flow channels 218 separated by untrimmed fins 214. Fluid flow through notch 194 thus helps to insure that boundary layers and flow rates are the same in each flow channel 218.

Once the internal assembly is enclosed within vessel 60, the inlet and outlet mounting collars 100, 124, the bearing assemblies, and housings assembled as described above are bolted or otherwise secured to vessel 60 using conventional methods known to those skill in the art.

In operation, as illustrated in FIG. 2, rotation of the vessel 60 is commenced by turning on motor 62. Motor 62 typically causes vessel 60 to rotate with a rotational velocity in a range between about 600 rotations/minute to about 10,000 rotations/minute with about 1,200 rotations/minute to about 3,600 rotations/minute being more preferred. A stream 38 is received by pump 80 which pumps stream 38 into the solid-liquid separator 10 through inlet line 72. Stream 38 is preferably pressurized by pump 80 such that the pressure is maintained within vessel 60 during operation of the solid-liquid separator 10. One embodiment of solid-liquid separator 10 operates under a pressure in a range between about 15 psi ($1.03 \times 10^4$ Pa) to about 600 psi ($4.13 \times 10^6$ Pa) with about 75 psi ($5.17 \times 10^5$ Pa) to about 125 psi ($8.61 \times 10^5$ Pa) being more preferred. Stream 38 may include virtually any liquid which has been contaminated with a particulate component having a density greater than the liquid. For most applications, however, the liquid will be water. Thus, although water is referred to herein as the liquid being clarified, it will be understood that the solid-liquid separator 10 of the present invention may be used to clarify a variety of liquids.

As illustrated in FIG. 10, inlet stream 38 enters the solid-liquid separator 10 through feed stream inlet 114. As the feed stream 38 reaches the rotating hollow shaft 98, it is forced through access ports 110 (see also FIG. 4) into the hollow shaft 98 where the stream is accelerated to the same rotational velocity as the vessel 60. Flow through the rotating hollow shaft 98 proceeds in the direction of arrow A. Upon reaching the entrance to vessel 60 adjacent inlet mounting flange 104, the centrifugal force imposed due to the rotation of the vessel 60 pushes the stream radially outwardly towards wall 92 of vessel 60. As the stream enters the vessel 60, it enters one of the flow channels 218 (FIG. 9) and proceeds to fill the vessel 60.

The flow channels 218 help eliminate the Coriolis effect. That is, if fins 184 were removed, as the fluid enters vessel 60, the fluid would swirl in a vortex. Such swirling produces a turbulent flow that suspends particles within the fluid. As discussed below, the inventive solid-liquid separator 10 operates by settling the particulate matter against wall 92 of vessel 60 from where it is subsequently removed. By passing the fluid through the discrete flow channels 218, swirling of the fluid is substantially eliminated. The fluid travels in a substantially laminar flow wherein the fluid rotates at the same speed as vessel 60. As a result, the potential for settling particulate within the liquid is maximized.

As stream 38 enters the vessel, it is forced around disc 176 along the direction of arrows B. Within vessel 60, the stream is subjected to the tremendous centrifugal forces imposed on it due to the rotation of the vessel 60. Thus, the more dense component of the stream flows radially outwardly while the less dense component flows radially inwardly or stays on top. Because of the centrifugal forces present in the solid-liquid separator, an average of approximately 500 g's to about 2,000 g's in this embodiment, substantially complete clarification of the fluid component occurs and a low liquid content of more dense particulate occurs in seconds. The solid-liquid separator 10 of the present invention can thus achieve in seconds the amount of separation that a static tank separator takes hours to achieve.

In stream 38 the particulate matter is forced by the rotation of vessel 60 so as to accumulate against wall 92 at equator 97. The accumulated particulate matter is identified as underflow 224. A boundary line 228 is defined between underflow 224 and the clarified water 226 radially inwardly disposed therefrom. Underflow 224 is allowed to accumulate and boundary line 228 rise until boundary line 228 is located radially inward of opening 166 of extraction tubes 160 (a condition illustrated in FIG. 10). Underflow 224 is subsequently extracted from pressure vessel 60 through extraction tubes 160 as described below.

Water flowing around the edge of disc 170 through axial flow passage 174 can stir up underflow 224 that has developed at the largest dimension radius or equator 97 of pressure vessel 60. This stirring, caused by eddy effects, works in opposition to the purpose of the solid-liquid separator. Therefore, notches such as v-notches 210 previously discussed with regard to FIG. 6 may be cut in the outer perimeter of disc 170. The notches minimize stirring by reducing the force of the water flow around disc 170, thereby reducing the eddy effects. Thus the v-notches 210 maintain boundary layer 228 between underflow 224 and clarified water 226.

Apart from functioning to support the fins 184, the various discs, particularly disc 170, function to assist in the removal of the particulate matter. That is, all fluid that enters vessel 60 must flow either to or around the outer edge of disc 170 before it can exit vessel 60. By forcing all of the fluid to flow to the outer edge of disc 170 at equator 97, all of the fluid is subject to the greatest centrifugal force produced by the rotation of vessel 60, thereby insuring that the highest concentration of particulate is removed from the incoming fluid. Furthermore, by positioning discs 176 and 178 on opposing sides of disc 170, the fluid flows radially inward and outward as it moves between the discs. This radial movement of the fluid increases the retention time of the fluid within the vessel, thereby subjecting the fluid to the centrifugal force of the vessel for a longer period of time. As a result, a larger portion of the particulate matter is removed. In an alternative embodiment, however, the inventive solid-liquid separator can be operated without the use of the discs, particularly disc 170.

Because gases may occasionally be found in the inlet stream 38, a gas layer 230 may form about the axis 90 on the inlet side of the vessel 60. Disc 170 effectively serves as a barrier between the inlet side and the outlet side of the vessel 60. Hence, gases found within the inlet stream will generally be found only on the inlet side of the vessel 60 because they are likely to be separated before the liquid passes through axial flow passage 174.

As inlet stream 38 continues to flow into the vessel 60, liquid passes through flow passage 174 into the outlet side of the vessel 60. The liquid or water 226 fills the outlet side of vessel 60 and then flows out through effluent channel 132. Clarified water 226 subsequently exits the solid-liquid separator 10 through overflow outlet 134 and pressure relief valve 136. Pressure relief valve 136 only opens when the back pressure in overflow outlet 134 overcomes the spring force for the valve, thereby ensuring that a predetermined pressure is maintained inside vessel 60. In an alternative embodiment, pressure relief valve 136 can be replaced with other operating systems that perform the same function. For example, pressure relief valve 136 can be replaced with an electronically operated valve and a pressure sensor. The valve is electronically opened when the pressure sensor senses a predetermined pressure within vessel 60.

Boundary line 228 is maintained at a desired level by periodically opening valve 148 and allowing underflow 224 to be extracted through extraction tubes 160. When valve 148 is opened, a pressure gradient is created between the interior of vessel 60 and the underflow outlet line 76. Flow of the separated particulate component (underflow 224) will proceed from the higher pressure environment within vessel 60 to the lower pressure through extraction tubes 160. This pressure differential may be created a number of ways, such as by operating the vessel 60 at ambient pressure and imposing a negative pressure on the extraction tubes 160, or, as is presently depicted, operating vessel 60 under pressure and imposing extraction tubes 160 to a near ambient pressure.

Recognizing that the eight extraction tubes 160 only extend into eight of the flow channels 218 (FIG. 9), boundary line 228 drops in these flow channels 218 as underflow 224 is extracted. As boundary line 228 in these flow channels 218 drops, underflow 224 from adjacent flow channels 218 flows through the underflow passage 190 to maintain the boundary line 228 at a generally constant level throughout the circumference of the vessel 60. In an alternative embodiment, it is envisioned that an extraction tube 160 can be feed to each discrete flow channel 218. In this embodiment, it is not necessary to have flow passage 190 between flow channels 218.

When underflow exit valve 148 is opened, any gas which has built up inside vessel 60 to form a gas layer 230 will immediately begin escaping through orifice 164 of plug 162 which is in fluid communication with removal channel 130. Thus, orifice 164 should preferably be sized such that any anticipated gas buildup may be removed through the periodic opening of valve 148. Orifice 164, however, should be sufficiently small so as to enable sufficient draw on extraction tubes 160 to remove underflow 224. Thus, the size of orifice 164 depends in part upon the constituency and nature of the fluid flow. In one embodiment, orifice 164 has a threaded diameter of approximately 0.375 inch (1 cm). This 0.375 inch (1 cm) orifice is threaded to allow an insert whereby the orifice diameter may be reduced or even totally occluded, depending upon the insert selected. An insert may be threaded into orifice 164 even after construction of the pressure vessel 60 because orifice 164 remains accessible through exit orifice 140 and removal channel 130. The adjustable nature of this orifice diameter allows orifice 164 to be tailored for different fluid flows while using the same solid-liquid separator 10.

In one embodiment of the present invention, spherical vessel 60 has an inside diameter of about 19 inches (48 cm) and is capable of processing approximately 38 liters of water each minute. This provides a residence time of approximately 1.5 minutes in the solid-liquid separator 10 while subjecting the water to an average of approximately 700 g forces. This is roughly the equivalent of 2 hours of residence time in a static clarifier having the same capacity. The solid-liquid separator of the present invention is capable of clarifying water to remove at least 99% of solids. In alternative embodiments, the present invention envisions that typical vessels can be formed having a maximum inside diameter in a range between about 6 inches (15 cm) to about 120 inches (300 cm) with about 12 inches (30 cm) to about 60 inches (150 cm) being more preferred. Such vessels can be designed to process fluid at a rate in a range from about 0 liters/minute to about 4,000 liters/minute with about 1 liter/minute to about 1,000 liters/minute being more preferred.

The resulting underflow stream 70 is passed through a bag filter, filter press, or belt filter to remove remaining water and to "cake" the solids. The "caked" solids may then be disposed of by composting or other method known in the art. Ultimately, the disposal method will depend upon the composition of the "caked" solids. For instance, solids containing heavy metals cannot be composted and other appropriate disposal methods will be used.

To shut down the solid-liquid separator, the pump and motor are turned off, then the vessel is drained and flushed. Alternatively, fluid may simply be left within the vessel during uses.

From the foregoing, it will be appreciated that the solid-liquid separator of the present invention overcomes the problems of the prior art. In particular, embodiments of the present invention as described herein achieve solid-liquid separation in a rotating vessel by use of centrifugal force and by directing the flow of the particulate-containing material. Such embodiments also include a solid-liquid separator that accomplishes solid-liquid separation at a rate that is a quantum increase compared to traditional thickeners and high-rate thickeners while occupying a footprint that is practical for virtually any application. Finally, preferred embodiments of the solid-liquid separator of the present invention separate solids from a liquid such that the compacted solid has a liquid content of the total particulate-containing liquid feed material that is about five percent or less.

Figure 11:
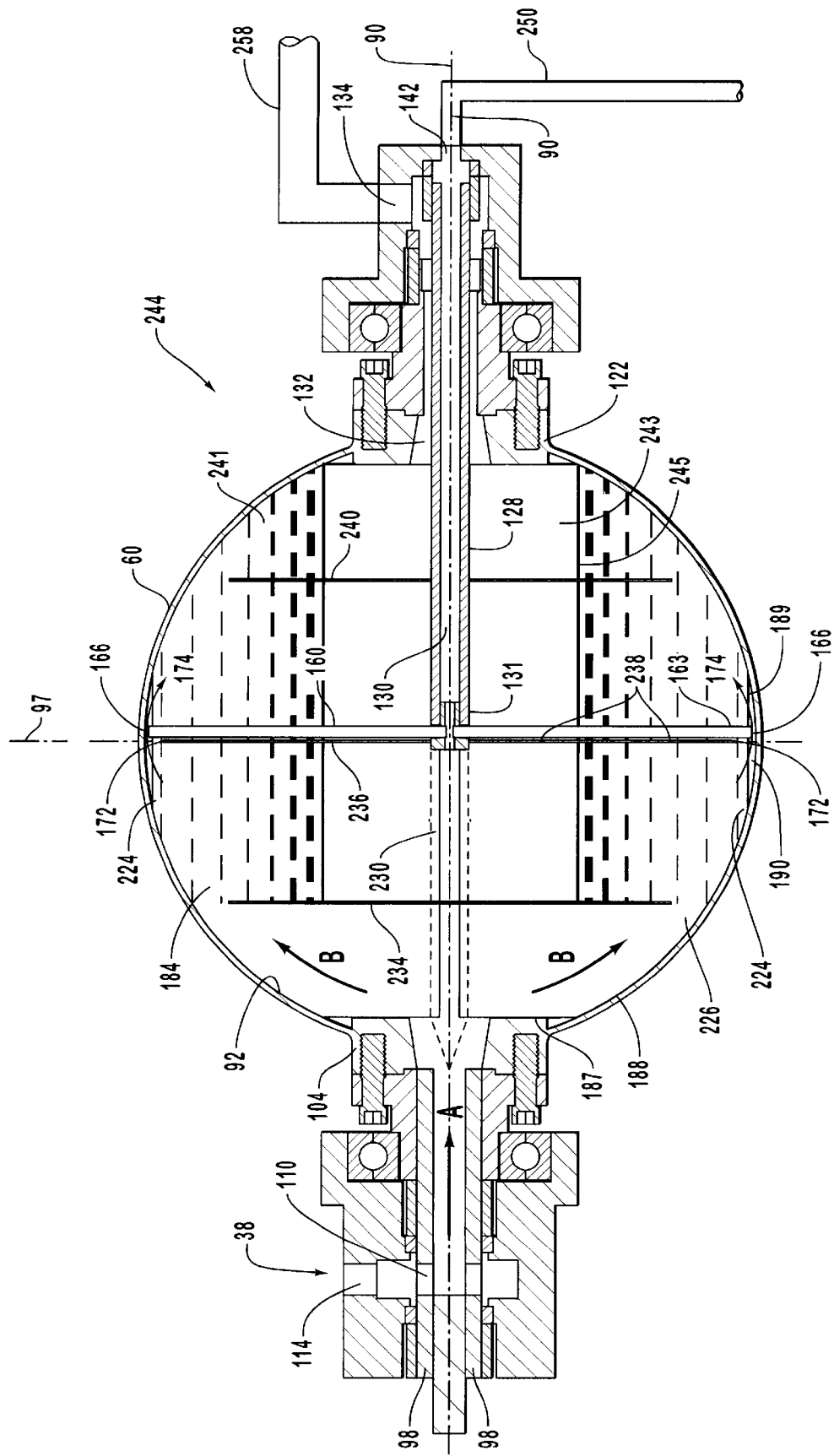
FIG. 11 is a cross-sectional view of one embodiment of a liquid-liquid separator of the present invention.
Figure 12:
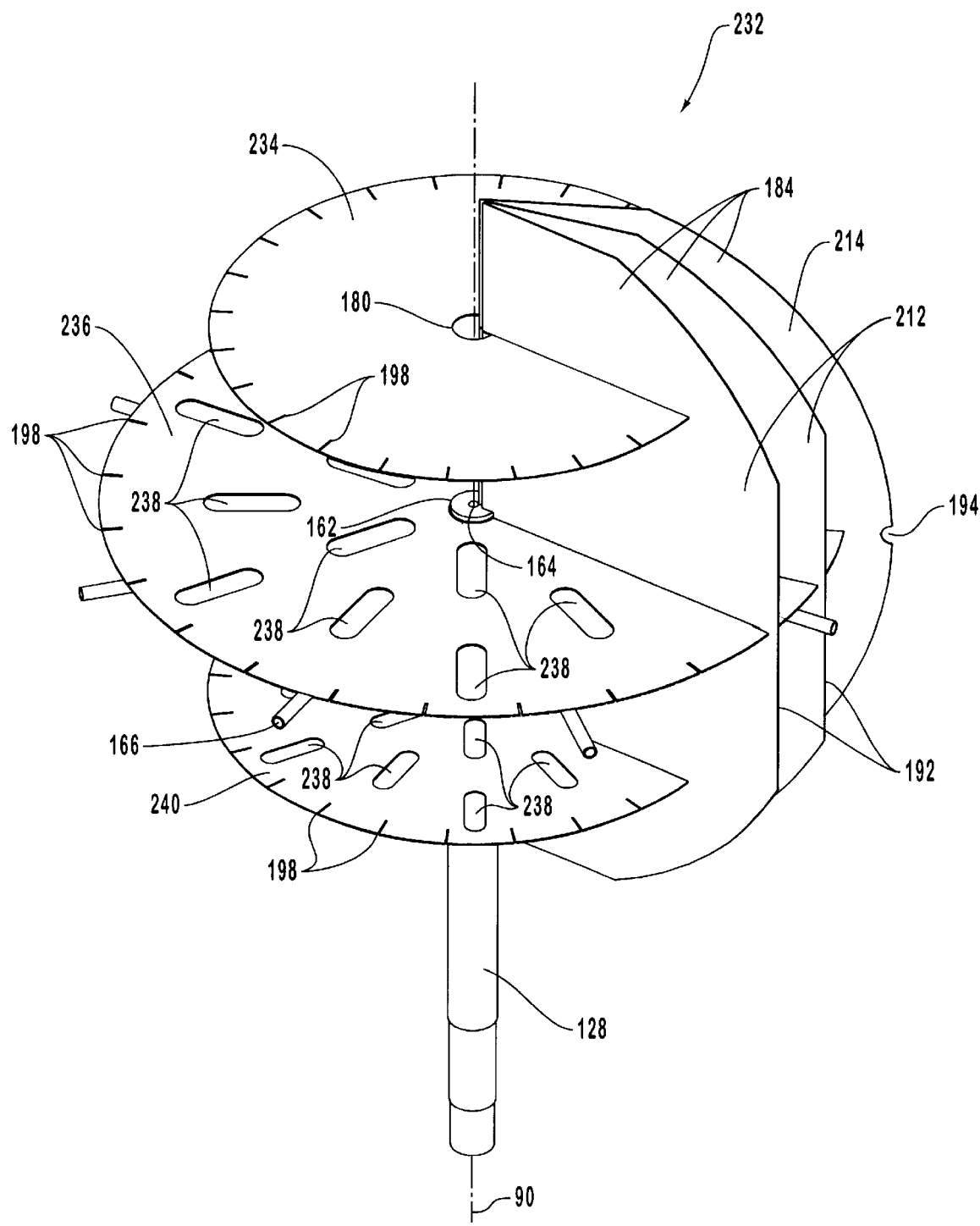
FIG. 12 is a perspective view of a partial assembly of the interior of the vessel of liquid-liquid separator shown in FIG. 11, revealing a portion of the fin and perforated disc assembly.

Depicted in FIGS. 11 and 12, another embodiment of the present invention relates to a liquid-liquid separator 244 that uses a similar construction to solid-liquid separator 10 depicted in FIGS. 2–10. In contrast to solid-liquid separator 10 that is primarily designed to remove particulate from a fluid, liquid-liquid separator 244 is primarily designed to separate a mixed liquid of two or more immiscible liquids such as oil and water.

FIG. 11 illustrate a subassembly 232 of liquid-liquid separator 244. Subassembly 232 includes a solid inlet side minor disk 234 similar to inlet side minor disk 176 depicted in FIG. 6. A center disk 236 is depicted as having a plurality of perforations 238. Perforations 238 allow for the passage of the liquids therethrough. Additionally, an outlet side minor disk 240 is also depicted as having a plurality of perforations 238 extending therethrough.

As depicted in FIG. 10, the remainder of subassembly 232 and the vessel in which subassembly 232 is disposed are substantially the same as that previously discussed with regard to solid-liquid separator 10. As such, like elements are identified by like reference characters. Furthermore, the alternatives discussed above with regard to solid-liquid separator 10 are also applicable to liquid-liquid separator 244.

Liquid-liquid separator 244 also operates in a manner similar to solid-liquid separator 10. For example, with vessel 60 rotating, the mixed liquid is pumped into inlet 114 so as to flow down hollow shaft 98 along arrow A. Upon reaching the entrance to vessel 60, the mixed liquid enters one of the flow channels 218 (FIG. 9) and proceeds to fill the vessel 60. As a result of the centrifugal force produced by the rotation of vessel 60 and the impact of the mixed liquid against minor disk 234, the mixed liquid is pushed radially outwardly towards wall 92 of vessel 60 and around disk 234.

The mixed liquid includes a heavy liquid 241 and a light liquid 243 which are defined by their relative densities. Where the mixed liquid includes more than two immiscible liquids, heavy liquid 241 or light liquid 243 can be defined to include more than one liquid. The drawn off liquid that includes more than one liquid can subsequently be processed through a second liquid-liquid separator 244 so as to separate the liquids therein.

As a result of the applied centrifugal force, heavy liquid 241 flows toward wall 92 at equator 97. Light liquid 243 flow toward the center or longitudinal axis of vessel 60. As a result, a boundary line 245 is formed between heavy liquid 241 and light liquid 243. Boundary line 245 is maintained within a range of radial distances away from rotational axis 90. This liquid-liquid boundary line 245 is analogous to boundary line 228 depicted in FIG. 10 for solid-liquid separator 10. In contrast, however, liquid-liquid boundary line 245 is positioned at a radial distance from rotational axis in a range from about ⅕ to about ⅘ the distance between rotational axis 90 and the maximum diameter at equator 97, preferably from about ¼ to about ¾ the distance, even more preferably from about ⅓ to about ⅔ the distance.

As a result of perforations 238 extending through discs 236 and 240, light liquid 243 and gas 230 can flow through discs 236 and 240 and out effluent channel 132. Since gas 230 exits with light liquid 243, there is no need for a gas escape orifice at inlet end 131 of exit tube 128. In this embodiment, discs 236 and 240 function primarily as supports for fins 184 and thus can be any desired configuration. Alternatively, discs 236 and 240 can be removed.

Heavy liquid 241 is removed from vessel 60 through extraction tubes 160 and exit tube 128. Where there are fewer extraction tubes 160 than discrete flow channels 218, underflow passages 190 are formed between discrete flow channels 218 so that boundary line 245 is constant for all flow channels 218. Since boundary line 245 is typically closer to longitudinal axis 90 than boundary line 189, second end 163 of extraction tubes 160 can be moved closer to longitudinal axis 90.

Figure 13:
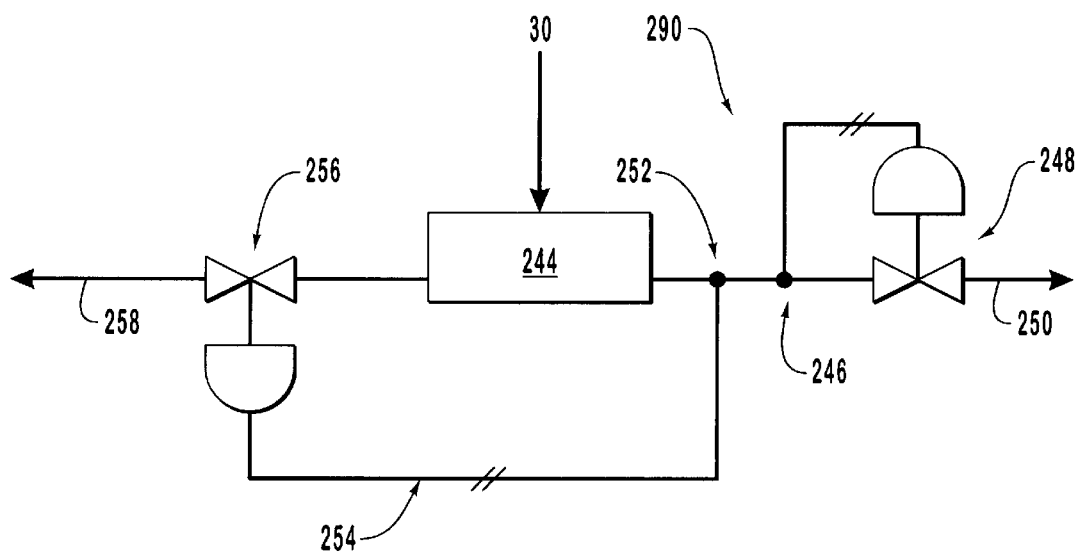
FIG. 13 is a block diagram showing one embodiment of a valve assembly controlling liquid flow into and out of the liquid-liquid separator.

Depicted in FIG. 13 is one embodiment of a control system 290 for removing the separated liquids from liquid-liquid separator 244. Specifically, a supply stream 30 containing two immiscible liquids is fed to liquid-liquid separator 244 where the two liquids are separated as discussed above. Control system 290 includes a first pressure sensor 246 coupled with a corresponding first valve 248 each located along first outlet stream 250. Additionally, a second pressure sensor 252 is also located on first outlet stream 250. A second valve 256 is located on second outlet stream 258. A signal line 254 transmits a signal from second pressure sensor 252 to second valve 256.

According to the present invention, a pressure differential is maintained between first valve 248 and second valve 256. The pressure differential is needed to maintain boundary line 245 at a defined radial distance from longitudinal axis 90 such that only the heavy liquid 241 exits through exit tube 128 (first outlet stream 250) and only light liquid 243 exits through effluent channel 132 (second outlet stream 258). That is, if there is no pressure differential, boundary line 245 may, depending on select variables, theoretically extend beyond wall 92 of the pressure vessel 60. As a result, both heavy liquid 241 and light liquid 243 would flow out through first outlet steam 250.

The amount of required pressure differential is based on the rotational velocity of liquid-liquid separator 244, the density of the at least two immiscible liquids contained within supply stream 30, and the desired location of boundary line 245. In practice, the pressure differential can be empirically determined. For example, initially first valve 248 is set to operate at a first pressure. That is, first valve 248 maintains first outlet stream 250 at the first pressure while enabling first outlet stream 250 to continually flow through first valve 248. Accordingly, if the flow of first outlet stream 250 decreases, first valve 248 closes a corresponding amount so as to maintain the first pressure. The amount of first pressure is in some regards arbitrary since it is the pressure differential that control the position of boundary line 245. In one embodiment, however, first pressure is typically in a range between about 5 psi ($3.45 \times 10^4$ Pa) to about 500 psi ($3.45 \times 10^6$ Pa) with about 15 psi ($1.03 \times 10^5$ Pa) to about 60 psi ($4.14 \times 10^5$ Pa) being more preferred.

Once the first pressure for first valve 248 is set, second valve 256 is set to operate at the same pressure. Liquid-liquid separator 244 is then operated at a flow rate for supply stream 30 and at a defined rotational velocity for vessel 60. Since valves 248 and 256 are set at the same operating pressure, both heavy liquid 241 and light liquid 243 flow out through first outlet stream 250. The operating pressure for second valve 256 is then incrementally decreased. As the operating pressure for second valve 256 is decreased, the pressure differential between first valve 248 and second valve 256 increases and boundary line 245 moves radially inward toward longitudinal axis 90. By monitoring the flow content though outlet streams 250 and 258 as the operating pressure of second valve 256 is incrementally decreased, the extreme operating pressures of second valve 256 can be determined. These extreme operating pressures are the operating pressures of second valve 256 at the points where light liquid 243 first start to flow out of first outlet stream 250 and heavy liquid 241 first start to flow out of second outlet steam 258. Second valve 256 is then set to operate at a pressure between the two extreme pressures. This places boundary line 245 centrally between the opening to effluent channel 132 and opening 166 to extraction tubes 160. The resulting pressure difference between first valve 248 and second valve 256 defines the pressure differential.

One of the unique benefits of the inventive system is its ability to compensate for changes in the ratio of the two immiscible liquids in supply stream 30. For example, an oil/water supply stream 30 feeds liquid-liquid separator 244. The oil/water supply stream 30 is a 50/50 mixture. At a given time, the 50/50 mixture suddenly experiences a load change to 10% oil and 90% water. Where the rotational velocity of liquid-liquid separator 244 remains substantially constant, an increased amount of water will tend to cause boundary line 245 to move toward rotational axis 90. Accordingly, the pressure sensed at first pressure sensor 246 and second pressure sensor 252 increases because of the increasing water volume within liquid-liquid separator 244. As a result of the signals from sensors 246 and 252, second valve 256 will automatically close slightly and first valve 248 will automatically open slightly. As a result, the operating pressures for valves 248 and 256 and the pressure differential between valves 248 and 256 are continually held relatively constant even though the ratio of liquids in supply stream 30 may continually change.

A 100% water supply stream 30 or a 100% oil supply stream 30 may also be controlled by maintaining boundary line 245 within the preferred distance range from rotational axis 90. For example, where a 100% oil supply stream 30 is fed to liquid-liquid separator 244, first valve 248 would eventually shut entirely in order to maintain the liquid-liquid interface within the preferred distance range away from rotational axis 90. Accordingly, where all liquid in supply stream 30 is oil, the oil would move through liquid-liquid separator 244 substantially without any mixing with the water that under this situation would be substantially stagnant therein. In one embodiment, first valve 248 may be a back-pressure regulator such as a Fisher 98L. Second valve 256 may be a differential pressure regulator such as a Fisher 98LD. These valves are made by Fisher Controls International, Inc., of Marshall Town, Iowa. It is appreciated that one skilled in the art would also recognized that other types of valves and valve configurations can also be used in control system 290.

Although sensors 246 and 252 are shown in FIG. 13 as both being coupled with first outlet stream 250, in an alternative embodiment, sensors 246 and 252 can each be coupled with second outlet stream 258. In yet another embodiment depicted in FIG. 14, a controller 260 can be used to withdraw the separated fluids from liquid-liquid separator 244. Signals are transmitted from first pressure sensor 246 by use of a first transmitter 262 that operates, by way of non-limiting example with a 4–20 mA signal. Similarly, first valve 248 transmits a signal by use of a first I/P converter 264 also with a 4–20 mA signal. First I/P converter 264 converts a 4–20 mA control signal to a pneumatic signal in order to operate first valve 248. Second outlet stream 258 is also configured with second pressure sensor 252, a second transmitter 266, a second valve 256, and a second I/P converter 268.

According to the present invention, when a load disturbance occurs within supply stream 30, first pressure sensor 246 and second pressure sensor 252 detect a change in respective pressures between the heavy liquid passing through first outlet stream 250 and the light liquid passing through second outlet stream 258. According to the present invention, such a load disturbance will be noted by controller 260 and respective valves 248 and 256 will be adjusted in order to maintain boundary line 245 at a preferred distance range away from rotational axis 90. According to this embodiment of the present invention, the pressure differential is maintained by the control of first valve 248 and second valve 256. Accordingly, the location of boundary line 245 may be maintained within the preferred distance range away from rotational axis 90.

One particular advantage of the present invention relating to control of the liquid-liquid separation system is the ability to separate immiscible liquids that have a specific gravity difference of less than about 5% of each other. The present invention is useful for separating immiscible liquids that have a specific gravity difference in a range from about 5% to about 0.5%, more preferably from about 4% to about 0.5%, and most preferably from about 3% to about 0.5%. Of course, the present invention is useful for separating immiscible liquids that have a specific gravity difference greater than 5%. Where a given liquid-liquid system is provided such that the specific gravities of the two liquids are known, control of such systems is achieved by the present invention. Calibration may be conducted for a given rotating pressurized vessel as disclosed herein. A first rpm may be established and various pressure differences noted for different ratios of the two liquids. A curve may be fitted to these data. Similarly, other rpm amounts may be tested in order to calibrate the rotating pressure vessel. By use of standard control methods such as a PID controller, the rpm amount of the rotating pressure vessel may be tracked and the liquid-liquid system separated by maintaining the boundary layer 245 within a desired range.

Figure 15:
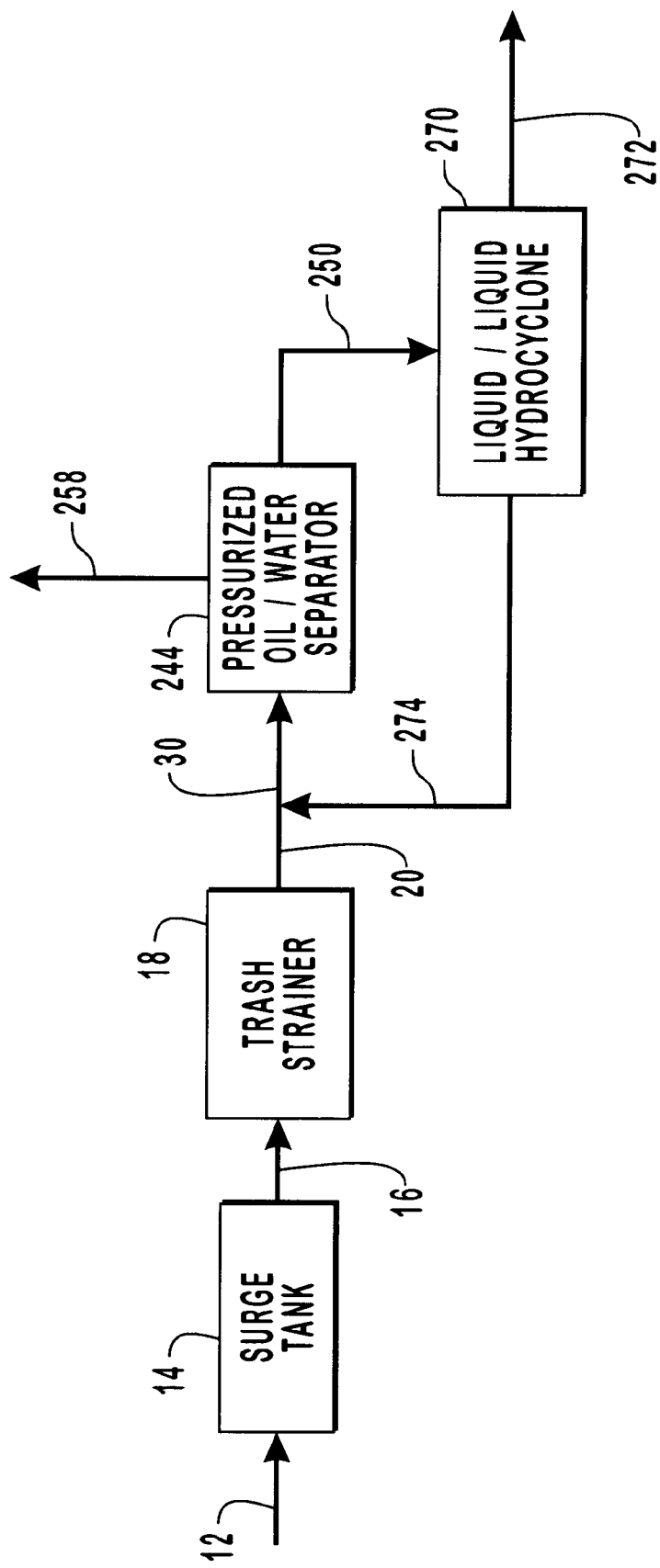
FIG. 15 is a block diagram overview of one process of the present invention that uses the liquid-liquid separator in connection with a hydrocyclone.

One application of liquid-liquid separator 244 is depicted in FIG. 15. Under certain conditions, environmental discharge regulations may require water to be cleaned of its entrained oil to a level below about 100 ppm. According to the embodiment of the present invention depicted in FIG. 15, feed stream 12 comprises substantially no loose particulate material except for any incidental trash that may be removed in trash strainer 18. Supply stream 30 enters liquid-liquid separator 244 and the two immiscible liquids are separated as described above.

Where first outlet stream 250 comprises the heavy component liquid such as water in an oil/water system, a liquid-liquid hydrocyclone 270 receives first outlet stream 250 and accomplishes a separation therein that removes more of the light component liquid from a concentration above about 100 ppm down to a concentration of less than about 10 ppm. Preferably, where an oil/water system is provided, first outlet stream 250 comprising the water or heavy component liquid may have an oil content of about 100 ppm. Liquid-liquid hydrocyclone 270 provides a purified heavy component liquid stream 272 that has an oil content in a range from about 0.1 to about 100 ppm, preferably from about 1 to about 10 ppm, and most preferably from about 2 to about 5 ppm. A recycle light component liquid stream 274 is drawn off liquid-liquid hydrocyclone 276 and is blended with flow path 20 to form supply stream 30. Typically, in a 50/50 oil/water flow path 20, the content of water within recycle light component liquid stream 274 will be in a range from about 50% water to about 80% water. Hydrocyclone 276 can comprise any hydrocyclone know to those skilled in the art. One example of a hydrocyclone is disclosed in U.S. Pat. No. 5,133,861 which for purposes of disclosure is incorporated herein by specific reference.

Figure 14:
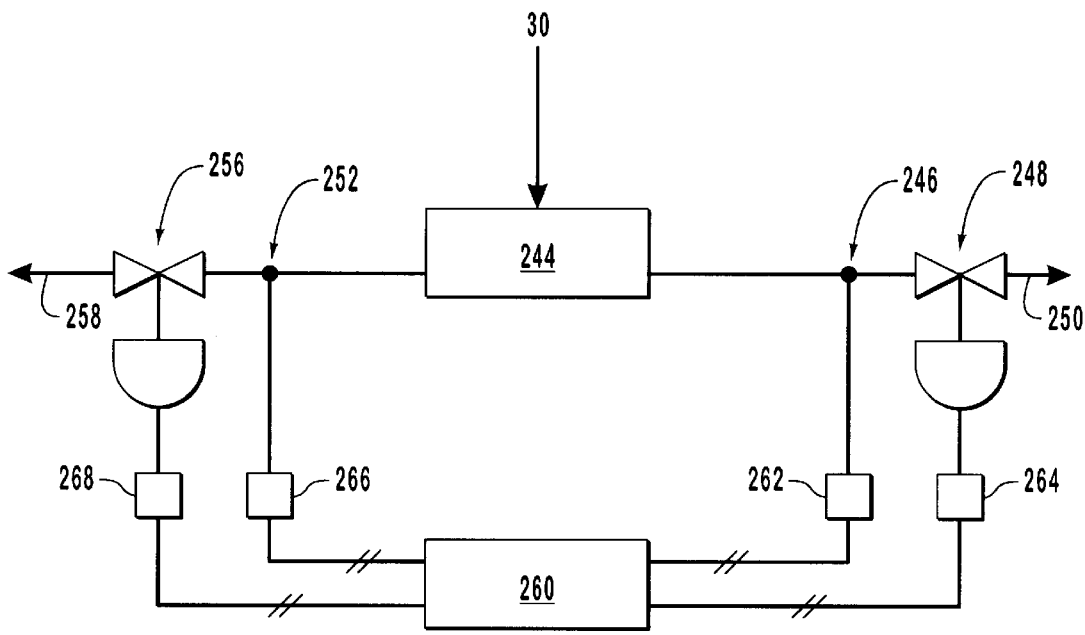
FIG. 14 is a block diagram showing another embodiment of a valve assembly controlling liquid flow into and out of the liquid-liquid separator.

Accordingly, a method of separating a liquid-liquid mixture by use of the configuration depicted in FIG. 14 may include one of the controlled embodiments depicted in FIGS. 12 and 13 and additionally include the provision of a hydrocyclone that is connected to the heavy component liquid outlet.

Figure 16:
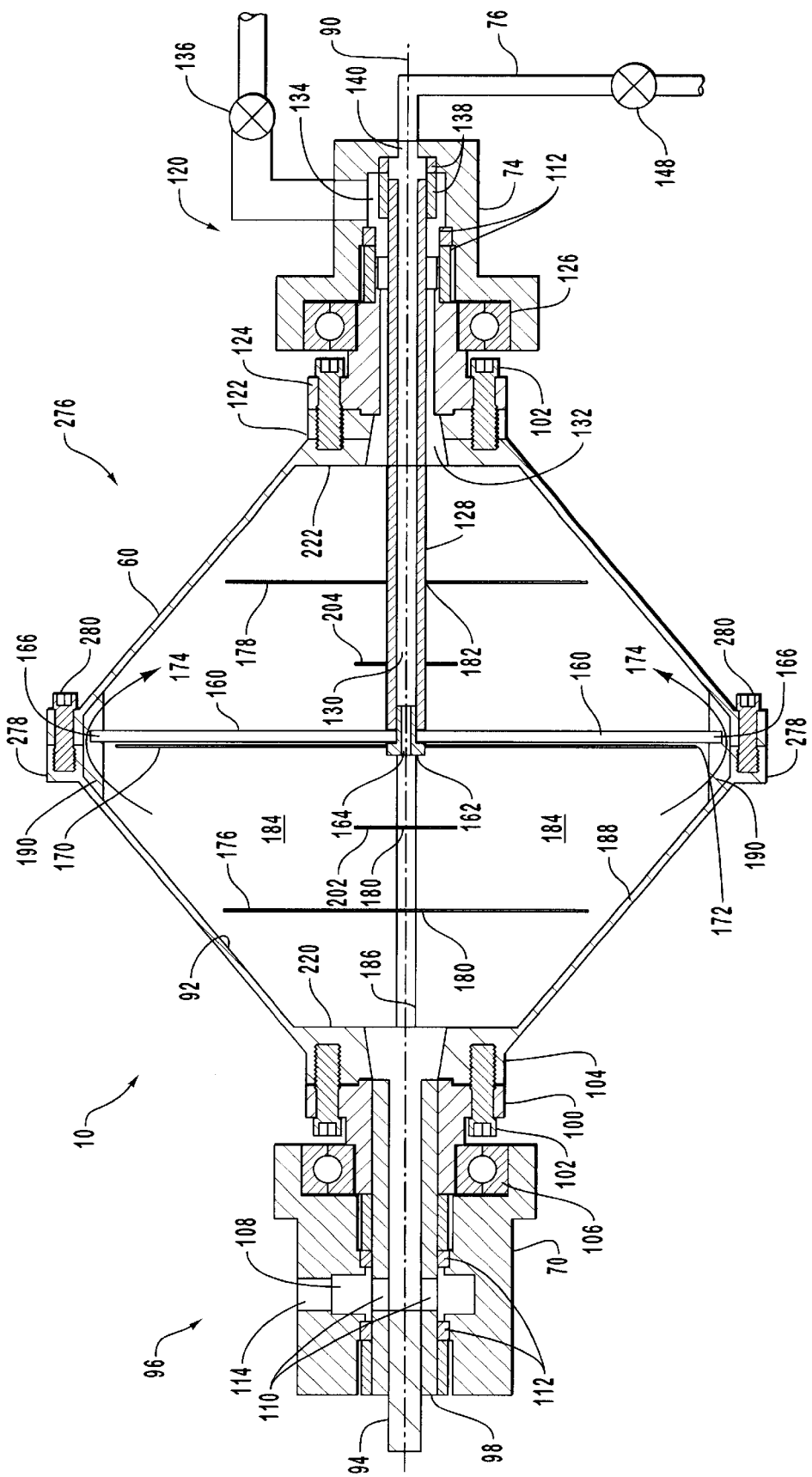
FIG. 16 is a cross-sectional view of an alternative embodiment of separator, wherein the spherical pressure vessel has been replaced with a double frusto-conical pressure vessel.

Another embodiment of the present invention is depicted in FIG. 16, wherein the more expensive sphere pressure vessel 60 has been replaced with a double truncated cone pressure vessel 276. FIG. 16 depicts extraction tubes 160 that are longer than their equivalents depicted in FIG. 3. Additionally, a flanged edge 278 of the double truncated cone 276 is provided with a bolt 280 in order to assemble double truncated cone 276. A gasket or an o-ring (not pictured) may be placed between mating surfaces of flanged edge 278 in order to achieve a liquid-tight seal that holds under the pressure contemplated for the present invention.

FIG. 16 also depicts the axial flow passage 174 to be more angular due to the shape of double truncated cone 276. One distinct advantage of double truncated cone 276 is the absence of a decreasing flow slope. In other words, the flow slope along vessel wall 92 is constant for solid particulate matter or a heavy component liquid as it moves along vessel wall 92 in the direction toward radial extraction tube opening 166.

Figure 17:
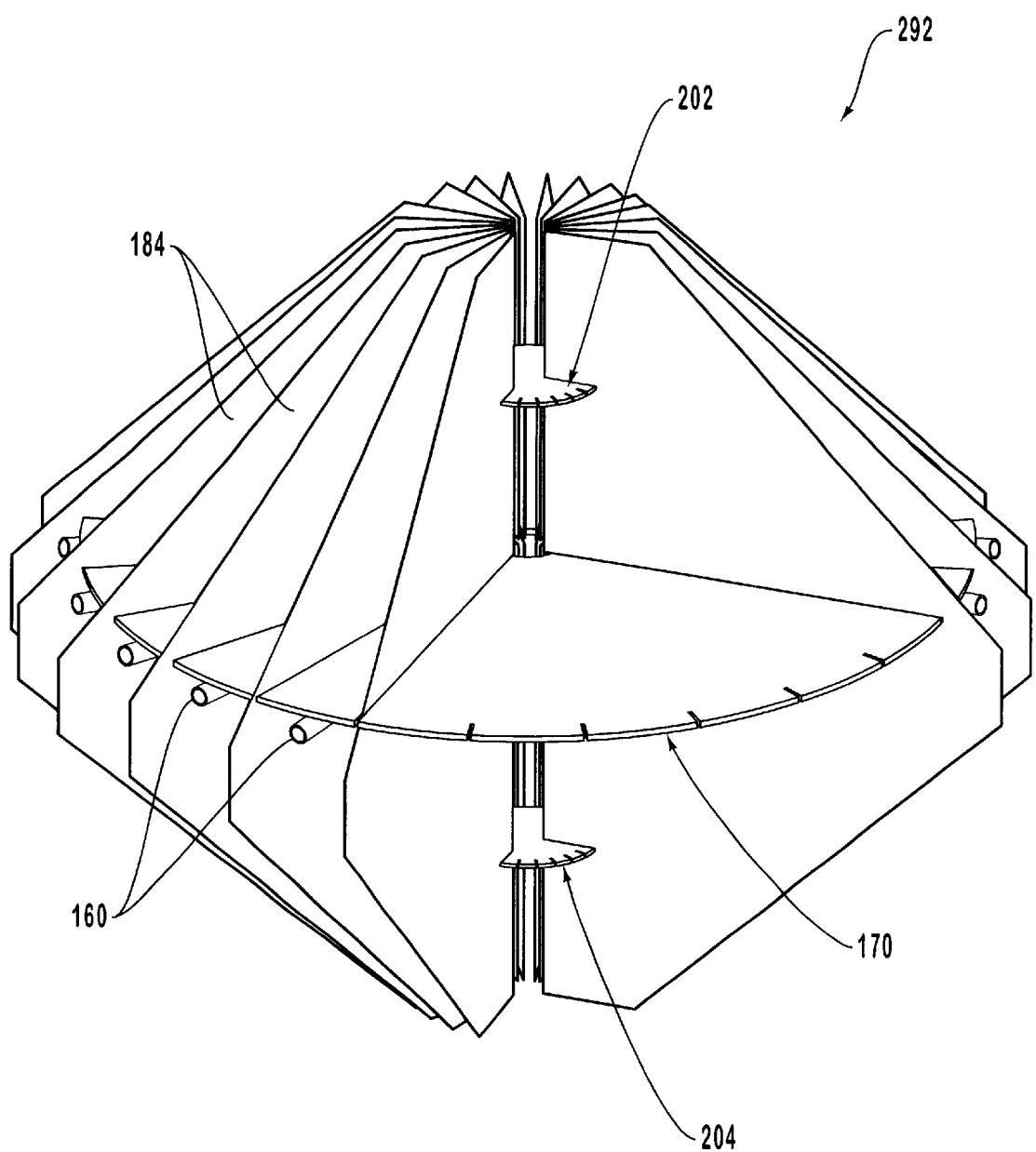
FIG. 17 is a perspective view of a partial assembly of the interior of the vessel of separator shown in FIG. 16.

FIG. 17 is a perspective view of a separator subassembly 292 including additional disks 202, 204 along with at least one major disk such as center disk 170. FIG. 17 depicts a fin shape for radial fins 184 that conform with the double truncated cone shape of pressure vessel 270. An additional distinction between subassembly 292 and corresponding components in solid-liquid separator 10 is that an extraction tube 160 is disposed between each fin 184 in subassembly 292. In this embodiment, underflow flow passage 190 need not be formed between adjacent flow channels 218. According to the present invention, double truncated cone 270 depicted in FIGS. 16 and 17 may be used with either a solid-liquid separator or a liquid-liquid separator.

In yet another embodiment, it is envisioned that a single separator can be configured to simultaneously separate both two or more immiscible liquids and particulate matter from a fluid steam. The separator can be configured substantially identical to those disclosed in FIGS. 10 and 11. In this embodiment, however, the particulate matter collects at the farthest radial distance from the rotational axis, the lighter of the two immiscible liquids collects about the rotational axis, and the heavier of the two immiscible liquids collects between the particulate matter and the lighter liquid. Two separate sets of extractions tubes are used. The first set extends down to the particulate matter for extraction thereof. This is similar to that previously discussed with regard to FIG. 10. The second set of extraction tubes extends to the heavier liquid for extraction thereof. The lighter liquid exits in the same manner as previously discussed with regard to FIG. 11.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A separator comprising:
    a vessel having a peripheral wall bounding a chamber, the vessel being rotatable about a rotational axis extending through the vessel, the chamber communicating with an inlet and a first outlet;
    a plurality of fins disposed within the chamber, each of the fins outwardly projecting from the rotational axis in substantially parallel alignment with the rotational axis;
    an exit tube disposed along at least a portion of the rotational axis of the vessel, at least a portion of the exit tube having a first end disposed within the chamber and an opposing second end in fluid communication with the exterior of vessel; and
    an extraction tube disposed within the chamber, the extraction tube having a first end in fluid communication with the exit tube and an opposing second end bounding a second outlet, the second outlet being disposed at a distance from the rotational axis, the first outlet being disposed closer to the rotational axis than the second outlet such that during use a fluid boundary line can be formed between the first outlet and the second outlet.

2. A separator as recited in claim 1, further comprising a first disc disposed within the chamber, the first disc outwardly projecting from the rotational axis so as to intersect with each of the plurality of fins.

3. A separator as recited in claim 2, wherein the first disc radially outwardly projects from the rotational axis in substantially perpendicular alignment with the rotational axis.

4. A separator as recited in claim 2, further comprising a plurality of perforations extending through the first disc.

5. A separator as recited in claim 2, wherein the first disc has a perimeter edge with a plurality of notches formed thereat.

6. A separator as recited in claim 2, wherein the first disc is disposed adjacent to the extraction tube.

7. A separator as recited in claim 1, further comprising a plurality of spaced apart discs disposed within the chamber, each disc radially outwardly projecting from the rotational axis in substantially perpendicular alignment with the rotational axis so as to intersect with each of the plurality of fins.

8. A separator as recited in claim 1, wherein the extraction tube radially outwardly projects from the exit tube so as to be substantially perpendicular to the exit tube.

9. A separator as recited in claim 1, further comprising a plurality of extraction tubes outwardly projecting from the rotational axis within the chamber, each extraction tube having a first end in fluid communication with the exit tube and an opposing second end bounding a second outlet, each second outlet being disposed at a distance from the rotational axis.

10. A separator as recited in claim 1, wherein each of the plurality of fins has an outer edge, at least a portion of each outer edge being disposed adjacent to the peripheral wall so as to form a plurality of discrete flow channels.

11. A separator as recited in claim 10, further comprising:
    the vessel having an equator with a maximum diameter encircling the rotational axis; and
    a passage extending between at least two of the discrete flow channels at the equator.

12. A separator according to claim 1, wherein the chamber has a substantially spherical configuration.

13. A separator according to claim 1, wherein the chamber has the configuration of a double truncated cone.

14. A separator according to claim 1, further comprising an orifice formed at the first end of the exit tube, the orifice facilitating fluid communication between the chamber and the exit tube.

15. A separator as recited in claim 1, wherein the vessel is configured to operate under a pressure in a range from about $6.90 \times 10^4$ Pa to about $6.90 \times 10^5$ Pa.

16. A separator as recited in claim 1, further comprising a pressure actuated valve coupled with the outlet port of the vessel.

17. A separator as recited in claim 1, further comprising:
    a first valve coupled with the exit tube;
    a second valve coupled with the outlet channel, the outlet channel being in fluid communication with the first outlet;
    a first pressure sensor communicating with the exit tube prior to the first valve, the first pressure sensor being electrically connected to the first valve; and
    a second pressure sensor communicating with the exit tube prior to the first valve, the second pressure sensor being electrically connected to the second valve.

18. A separator as recited in claim 17, wherein the first valve and the second valve are configured to maintain a pressure differential therebetween.

19. A separator as recited in claim 1, further comprising:
a first valve coupled with the exit tube;
a second valve coupled with the outlet channel, the outlet channel being in fluid communication with the first outlet;
a first pressure sensor communicating with the exit tube prior to the first valve;
a second pressure sensor communicating with the outlet channel prior to the second valve;
a controller in electrical communication with the first valve, the second valve, the first pressure sensor, and the second pressure sensor.

20. A separator as recited in claim 1, wherein the inlet is disposed at a first end of the vessel and the first outlet is disposed on an opposing second end of the vessel.

21. A separator as recited in claim 1, wherein the rotational axis extends through at least a portion of the inlet and the first outlet.

22. A separator comprising:
a vessel having a peripheral wall bounding a chamber, the chamber communicating with an inlet channel and an outlet channel, the vessel being rotatable about a rotational axis extending through the vessel;
a plurality of fins disposed within the chamber, each of the fins outwardly projecting from the rotational axis in substantially parallel alignment with the rotational axis;
an exit tube disposed along at least a portion of the rotational axis of the vessel, at least a portion of the exit tube having a first end disposed within the chamber and an opposing second end in fluid communication with the exterior of vessel;
an extraction tube disposed within the chamber, the extraction tube having a first end in fluid communication with the exit tube and an opposing second end disposed a distance from the peripheral wall; and
a first disc disposed within the chamber, the first disc outwardly projecting from the rotational axis so as to intersect with each of the plurality of fins.

23. A separator as recited in claim 22, wherein the first disc radially outwardly projects from the rotational axis in substantially perpendicular alignment with the rotational axis.

24. A separator as recited in claim 22, further comprising a plurality of perforations extending through the first disc.

25. A separator as recited in claim 22, wherein the first disc has a perimeter edge with a plurality of notches formed thereat.

26. A separator as recited in claim 22, wherein the first disc is disposed adjacent to the extraction tube.

27. A separator comprising:
a vessel having a peripheral wall bounding a chamber, the chamber communicating with an inlet channel and an outlet channel, the vessel being rotatable about a rotational axis extending through the vessel;
a plurality of fins disposed within the chamber, each of the fins outwardly projecting from the rotational axis in substantially parallel alignment with the rotational axis;
an exit tube disposed along at least a portion of the rotational axis of the vessel, at least a portion of the exit tube having a first end disposed within the chamber and an opposing second end in fluid communication with the exterior of vessel;
an extraction tube disposed within the chamber, the extraction tube having a first end in fluid communication with the exit tube and an opposing second end disposed a distance from the peripheral wall;
a first valve coupled with the exit tube;
a second valve coupled with the outlet channel of the vessel;
a first pressure sensor communicating with the exit tube prior to the first valve, the first pressure sensor being electrically connected to the first valve; and
a second pressure sensor communicating with the exit tube prior to the first valve, the second pressure sensor being electrically connected to the second valve.

28. A separator as recited in claim 27, wherein the first valve and the second valve are configured to maintain a pressure differential therebetween.

* * * * *

UNITED STATES PATENT AND TRADEMARK OFFICE
CERTIFICATE OF CORRECTION

PATENT NO.   : 6,346,069 B1
DATED         : February 12, 2002
INVENTOR(S)  : Kevin E. Collier It is certified that error appears in the above-identified patent and that said Letters Patent is hereby corrected as shown below:

Column 2,
Line 3, after "separation." change "On" to -- One --

Column 4,
Line 7, after "system" change "include" to -- includes --
Line 66, after "provide" change "an" to -- a --

Column 12,
Line 31, before "216" change "rotch" to -- notch --

Column 13,
Line 43, before "with" insert a space

Column 16,
Line 58, after "FIG. 11" change "illustrate" to -- illustrates --

Column 17,
Line 27, before "toward" change "flow" to -- flows --

Signed and Sealed this

Eighteenth Day of February, 2003

JAMES E. ROGAN
*Director of the United States Patent and Trademark Office*